United States Patent [19]

Ikeno et al.

[11] Patent Number: 5,649,004
[45] Date of Patent: Jul. 15, 1997

[54] PRIVATE BRANCH EXCHANGE

[75] Inventors: Toshihiko Ikeno, Yokohama; Nobuhiro Ikeda, Kawasaki, both of Japan

[73] Assignee: Canon Kabushiki Kaisha, Tokyo, Japan

[21] Appl. No.: 467,071

[22] Filed: Jun. 6, 1995

Related U.S. Application Data

[63] Continuation of Ser. No. 54,321, Apr. 28, 1993, abandoned.

[30] Foreign Application Priority Data

Apr. 28, 1992 [JP] Japan ................................. 4-136343
Apr. 28, 1992 [JP] Japan ................................. 4-136349

[51] Int. Cl.⁶ ............................... H04M 3/54; H04M 3/50
[52] U.S. Cl. ........................ 379/212; 379/67; 379/210; 379/211; 379/355
[58] Field of Search .............................. 379/164, 165, 379/171, 177, 178, 174, 180, 181, 182, 183, 201, 210, 211, 212, 213, 216, 214, 219, 233, 355, 46, 67, 88, 89; 358/407

[56] References Cited

U.S. PATENT DOCUMENTS

| | | | |
|---|---|---|---|
| 4,436,962 | 3/1984 | Davis et al. | 379/210 |
| 4,629,831 | 12/1986 | Curtin et al. | 379/233 |
| 4,723,273 | 2/1988 | Diesel et al. | 379/211 |
| 4,809,321 | 2/1989 | Morganstein et al. | 379/210 |
| 4,885,769 | 12/1989 | Beierle | 379/210 |
| 5,023,868 | 6/1991 | Davidson et al. | 379/211 X |
| 5,027,341 | 6/1991 | Jarvis et al. | 379/210 |
| 5,029,196 | 7/1991 | Morganstein | 379/210 |
| 5,048,080 | 9/1991 | Bell et al. | 379/165 |
| 5,138,655 | 8/1992 | Takashime et al. | 379/188 |
| 5,182,766 | 1/1993 | Garland | 379/355 X |
| 5,267,307 | 11/1993 | Izumi et al. | 379/354 |
| 5,276,731 | 1/1994 | Arbel | 379/201 |
| 5,291,549 | 3/1994 | Izumi | 379/233 |
| 5,313,459 | 5/1994 | Matern | 379/201 |
| 5,365,582 | 11/1994 | Yamada et al. | 379/265 |
| 5,369,695 | 11/1994 | Chakravarti et al. | 379/211 |
| 5,416,834 | 5/1995 | Bales et al. | 375/211 |
| 5,432,846 | 7/1995 | Norio | 379/266 |
| 5,452,349 | 9/1995 | Uehara et al. | 379/211 |

FOREIGN PATENT DOCUMENTS

| | | | |
|---|---|---|---|
| 58-165469 | 9/1983 | Japan | 379/211 |
| 60-176354 | 9/1985 | Japan | 379/211 |
| 60-236352 | 11/1985 | Japan | 358/407 |
| 2-104157 | 4/1990 | Japan | 379/355 |
| 3-098361 | 4/1991 | Japan | 379/355 |
| 3-123295 | 5/1991 | Japan | 379/233 |

*Primary Examiner*—Ahmad F. Matar
*Assistant Examiner*—Scott L. Weaver
*Attorney, Agent, or Firm*—Morgan & Finnegan, L.L.P.

[57] ABSTRACT

A private branch exchange so adapted that a plurality of call transfer addresses for an incoming call can be set for an ISDN terminal includes a controller having a decision unit for analyzing the incoming call and deciding an extension terminal that is to receive the incoming call, and a first transmitting unit for transmitting set-up messages to an ISDN extension interface. The ISDN extension interface accommodates a line connected to one or more ISDN terminals and has a second transmitting unit for transmitting a predetermined first message of the set-up messages to the terminal to which the set-up messages from the first transmitting unit are to be sent, a receiving unit for receiving a predetermined second message from the ISDN terminal that has received the first message, and a third transmitting unit for transmitting this received message to the controller. The controller further has an analyzing unit for analyzing a transfer-addressed number, notification of which is given by the ISDN terminal, contained in the message from the third transmitting unit of the ISDN extension interface, and a notifying unit for notifying a plurality of extension terminals, which correspond to the transfer-addressed number, of the incoming call via the ISDN extension interface.

12 Claims, 27 Drawing Sheets

| ID | TRANSFER-ADDRESSED NUMBER 1 | TRANSFER-ADDRESSED NUMBER 2 | TRANSFER-ADDRESSED NUMBER 3 | --- |

FIG. 16

| ID1 | RECORDING CHANNEL NUMBER | PLAYBACK CHANNEL NUMBER | STAND BY MESSAGE NUMBER | ANSWER MESSAGE NUMBER | ID2 | TRANSFER-ADDRESSED NUMBER 1 | TRANSFER-ADDRESSED NUMBER 2 | ... |

FIG. 21

| ID1 | PLAYBACK CHANNEL NUMBER | STANDBY MESSAGE NUMBER | DESIGNATED MESSAGE NUMBER | ID2 | TRANSFER-ADDRESSED NUMBER 1 | TRANSFER-ADDRESSED NUMBER 2 | ... |

SET-UP MESSAGE FORMAT

| | |
|---|---|
| PROTOCOL IDENTIFIER | 600 |
| CALL NUMBER | 601 |
| MESSAGE TYPE | 602 |
| TRANSFER CAPABILITY | 603 |
| CHANNEL IDENTIFIER | 604 |
| ⋮ | |
| KEYPAD FACILITY | 605 |
| ⋮ | |
| CALLED NUMBER | 606 |
| ⋮ | |

FIG. 26

CALL-STATUS STORAGE TABLE

| EXTENSION TERMINAL NUMBER | CALL STATUS |
|---|---|
| 1 ("301") | BUSY |
| 2 ("302") | IDLE |
| 3 ("303") | IDLE |
| ⋮ | ⋮ |
| n ("30n") | IDLE |

FIG. 27

PRIVATE BRANCH EXCHANGE

This is a continuation of application Ser. No. 08/054,321, filed on Apr. 28, 1993, now abandoned.

BACKGROUND OF THE INVENTION

This invention relates to a private branch exchange and, more particularly, to a private branch exchange in which an extension accommodates an ISDN (integrated services digital network) terminal and a call transfer service or voice-recording service is supported via (or from) the ISDN terminal.

Additional services have been proposed for use in a network service that employs a high-speed information communication service such as an INS (information network system) serviced by NTT (Nippon Telegraph and Telephone Corporation). One example of such an additional service is a call transfer function. According to this function, an incoming call is not answered directly but is transferred to another user. One major advantage of this service is that since the service is provided on the INS side, one's own exchange does not require extra memory or hardware even though this service is enjoyed.

In order to utilize this call transfer function, a limitation is imposed in a case where the INS of NTT is used. Specifically, an ISDN terminal that the additional service function is capable of utilizing must be connected to an S/T point (i.e., S or T point) and a T point among user-network interface reference points (in line with JT-I411 of the Telecommunication Technology Committee (TTC) standards), where an S point is defined as a connection point in a network interface with a terminal, and a T point is defined as a connection point in a network interface with a network. Further, an agreement (contract) for the purpose of utilizing the additional service is required between the user and the network.

On the other hand, in a case where an ISDN terminal is used as an extension terminal of an exchange, this terminal must be connected to an S point rather than the aforementioned S/T point and T point of the user-network interface reference points. As a consequence, one must accept the inconvenience of not being able to utilize an additional service function such as the call transfer function.

If use of an ISDN terminal as the extension terminal of an exchange cannot be avoided and, moreover, it is desired to be able to use the transfer function as well, then, as a last resort, the user employing the conventional exchange must take the trouble to perform an "absent" setting with regard to his own terminal, thereby making this terminal an absence terminal, and must instead register the transfer-addressed extension number or an outside-line number with the exchange. If there is an incoming call, this operation causes the call to be transferred to the registered transfer address. In other words, the user does nothing more than employ an absence transfer function as the call transfer function in pseudo-fashion.

With the conventional exchange mentioned above, however, the following difficulties are encountered when using the call transfer function:

(1) Since a service function on the Information Network System ("INS") side is performed in so-called pseudo-fashion within one's own exchange, a memory incorporated within the extension is used to register the transfer-addressed extension number and the outside-line number. As a consequence, the internal memory for the absence setting must be increased in proportion to an increase in the number of extensions accommodated.

(2) It is difficult with the pseudo-transfer function to register a transfer destination if the transfer destination cannot be established at one location. As a result, the transfer service cannot be utilized effectively.

Further, owing to the fact that the ISDN terminal must be accommodated in the extension (S point) of the exchange, the large number of ISDN terminal functions which would be obtained if the ISDN terminal were connected to the S/T point or T point are not realized.

Still another disadvantage of using an ISDN terminal as an extension terminal of a private branch exchange occurs when a so-called "shift call" (or "reset call") operation is performed between extension terminals.

In a case where a transmission is made from an ISDN terminal of an extension to another extension terminal in a private branch exchange (PBX) according to the prior art, the extension number of only one party can be designated to make the transmission; transmissions cannot be made by designating a plurality of extension numbers. Accordingly, when the calling party calls an extension number from an ISDN terminal and the called party is found to be busy (a state in which the incoming call cannot be received), the calling party is required to temporarily release the call upon hearing a busy tone (BT) and then call another extension again. As long as the other party is busy again, the same operation must be repeated many times. This operation must be repeated until the party that is capable of receiving the incoming call receives the call. Though a shift call function from a single line telephone or leased telephone can be utilized in the conventional PBX (Private Branch Exchange), this function cannot be utilized from an ISDN terminal.

In a case where a call is placed from an extension telephone and the called party is busy, the shift call function is such that the call is transmitted automatically to an extension telephone having a number only the last digit of which differs from the extension number of the called party. In order to use this function, a call is issued from the telephone of an extension and, when the called party is busy, this party transmits a busy tone (BT) from the private branch exchange (PBX) to the telephone on the calling side. During the transmission of BT, the user on the calling side is required to dial in not only the extension number of the called party, but the last digits (one digit other than "1" if the extension number is "301") of extension numbers that differ from the extension number of the called party. When this is done, the PBX, which has received the dialed numeral, substitutes the received numeral for the last digit of the extension number of the earlier party. If the extension having the number with the substituted last digit is capable of receiving the incoming call, then this extension is made to receive the call.

The reason why the "shift call" function is capable of being utilized by a single line telephone in the prior art but is incapable of being utilized by an ISDN terminal telephone will be described in detail with reference to FIGS. 1 through 3.

FIG. 1 is a block diagram for describing the conventional PBX. As shown in FIG. 1, a PBX 501 accommodates, as extension terminals, an ISDN terminal 502 having extension number "201", single line telephones (SLT) 503–505 having extension numbers "301"–"303", respectively, and a single line telephone (SLT) 513 capable of utilizing the shift control function of the PBX 501. The SLT 513 is not an ISDN terminal.

The PBX 501 has an ISDN extension interface (i.e., basic rate interface or BRI) 506 for interfacing the ISDN terminal 502, SLT extension interfaces (SLTI) 507–509 for interfacing the SLT's 503–505, respectively, a communication controller (CC) 510 for supervising overall control of the PBX 501, a main memory (MM) 511 for storing various programs and data, a channel switch (TSW) 512 for connecting a voice channel when an extension conversation is performed, and an SLT extension interface (SLTI) 514 for interfacing the SLT 513.

The BRI 506 has call detecting means for detecting origination of a call from the ISDN terminal 502. The controller 510 has called number retrieving means for retrieving information, which designates the receiving party from the set-up message, when a call originates from the ISDN 504, called number analyzing means for analyzing the called extension from the information retrieved, and incoming-call control means for controlling the incoming call to the called extension. The memory 511 has a call-status storage table for storing the status of extensions.

FIGS. 2 and 3 are flowcharts illustrating a procedure for a case in which an outgoing-call transmission is made from the ISDN terminal 502, which does not possess the shift call function of the prior art, to another extension.

First, in a case where an outgoing call is sent from the ISDN terminal 502 of the extension number "201" to the extension number "301" (step S601), the BRI 506 in the PBX 501 detects this outgoing call and so notifies the controller 510 (step S602).

Upon receiving notification of the outgoing call, the controller 510 retrieves the information, which designates the number of the called party, from the set-up message of this call and extracts the information (step S603). It should be noted that this information is contained in a "call number" or "keypad facility" information element.

Upon extracting the party-number information, the controller 510 analyzes the called extension from this information (step S604) and judges that the called extension is the SLT 503 of extension number "301".

Next, the controller 510 examines the call status of extension number "301" by referring to the call-status storage table within the memory 511 (step S605). If extension number "301" is idle and capable of receiving the incoming call (YES at step S606), then the controller 510 shifts the area corresponding to the extension number "301" in the call-status storage table of memory 511 from the idle state to the busy state (step S607) and controls the SLTI 507 of extension number "301" so that the SLT 502 of extension "301" will receive the incoming call (step S608).

While the call is being received by the SLT 503 and the party is being called, the PBX 501 causes the ISDN terminal 502 to issue an RBT (ring-back tone).

If the SLT 503 answers (YES at step S610), this is detected by the SLTI 507, which proceeds to notify the controller 510. Upon being notified of the answer, the CC 510 controls the TSW 512 so as to connect a voice channel between the extension number "201" and the extension number "301", whereby a transition is made to a conversational state (step S611).

In a case where the SLT 503 fails to respond within a certain period of time (NO at step S610), the ISDN terminal 502 determines that the party is in a state in which it cannot answer and releases the call (step S609). In this case, the controller 510 shifts the area corresponding to the extension number "301" in the call-status storage table of memory 511 from the busy state to the idle state (step S612), halts the incoming call to the called extension (step S613) and releases the call (step S614).

If the extension "301" is found to be incapable of receiving the incoming call at step S606 because it is busy (or for some other reason), then the BRI 506 is controlled so as to send BT (a busy tone) to the ISDN terminal 502 of extension "201" and refuse the call (step S615). As a result, the user of the ISDN terminal 502 hears the BT and releases the call (step S616).

In a case where the extension "301" is incapable of participating in the call in the operation described above, the ISDN terminal 502 sends the outgoing call to the extension number "302", which is in the vicinity of extension number "301". It should be noted that the operation that follows the origination of the call is the same as that described in the case of extension "301" above. If the extension number "302" also is incapable of taking part in the call, then the ISDN terminal 502 sends the outgoing call to extension number "303", which is in the vicinity of the extension numbers "301", "302".

Thus, in a case where it is desired to establish communication with a certain party from an ISDN terminal with the conventional PBX, the call originating operation is repeated a number of times until the call can be transmitted to the extension telephone at which the party is present.

Next, a procedure will be described for a case in which an outgoing-call transmission is made from the SLT 513 (not an ISDN terminal) terminal 502, which possesses the shift call function of the prior art, to another extension.

First, in a case where an outgoing call is sent from the SLT 513 of the extension number "202" to the extension number "301", the SLTI 514 notifies the controller 510 of the dialed numerals received from the SLT 513. Upon receiving notification of reception of the dialed numerals, the controller 510 analyzes the dialed numerals and determines that the incoming call is for the SLT 503 of extension number "301".

Next, the controller 510 examines the call status of extension number "301" by referring to the call-status storage table within the memory 511. If it is discovered that the extension number "301" is busy and is incapable of receiving the incoming call, then BT is sent to the SLT 513 of extension number "202".

Upon hearing the BT, the user of SLT 513 enters the dial number "2", while still listening to the BT, in order to request transmission of the call to extension number "302", which is in the vicinity of extension number "301".

As a result, when the SLTI 514 receives the dialed numeral "2", the controller 510 is notified of this numeral. Upon being so notified, the controller 510 analyzes this numeral and determines that the destination of the incoming call is SLT 504 of extension number "302". Then, upon referring to the call status of the extension "302" in the call-status storage table within memory 511 to determine that the extension "302" is in the idle state and is capable of receiving the incoming call, the controller 510 shifts the area corresponding to extension number "302" in the call-status storage table of the memory 511 from the idle state to the busy state and controls the SLTI 508 corresponding to extension "302" so that the incoming call is received at the SLT 504 of extension "302".

While the call is being received by the SLT 504 and the party is being called, the PBX 501 causes the SLT 513 to issue the Ring Back Tone ("RBT").

If the SLT 504 fails to respond within a certain period of time, the user of SLT 513 enters the dial number "3", while listening to the RBT, in order to request transmission of the call to extension number "303", which is in the vicinity of extension numbers "301", "302", and requests transmission of the call to number "303", which is the result of substituting the numeral "3" for the last digit of earlier call destination "302".

Henceforth the call-originating operation utilizing the shift call function is repeated until communication with the desired party is established by the procedure set forth above.

When an answer is received from the party, a transition is made to the conversational state through an operation similar to that for the case of the ISDN terminal 502.

(3) Thus, another disadvantage of the conventional PBX is that since the shift call function cannot be utilized when it is attempted to send a call from the ISDN terminal of an extension to another extension, it is necessary to release the call and re-dial a neighboring extension whenever the desired party is busy or cannot answer. This is a very troublesome task.

SUMMARY OF THE INVENTION

An object of the present invention is to provide a private branch exchange in which the function of an extension terminal can be exploited effectively to the maximum degree, and in which a plurality of transfer destinations can be furnished with a transfer service without providing additional memory within the exchange.

According to an aspect of the invention, the function of the terminal is a call transfer function. In accordance with this function, a plurality of transfer destinations can be made in a case where the transfer destination cannot be established at one location. As a result, it is possible to transfer an incoming call to a plurality of locations so that a highly sophisticated transfer service may be realized. Further, even if an ISDN terminal is accommodated (at an S point) by an extension of the exchange, the functions of terminals at S/T and T points can be exploited effectively to the maximum extent.

According to another aspect of the invention, the function of the terminal is a recording function in case of absence or a designated-message playback function. In accordance with this function, utilizing the call transfer function of the extension terminal makes it possible to share use of a voice recording unit or voice playback unit of the exchange without providing each extension terminal with a message recording function or playback function. Further, since the call transfer function can be utilized to designate message recording or playback in a voice recording unit or voice playback unit, it is unnecessary to perform a complicated setting operation from each extension terminal relative to the exchange. This enhances operability. Furthermore, data relating to voice recording or playback need not be registered using the internal memory of the exchange. This makes it unnecessary to increase the internal memory for this purpose and thus enables a reduction in cost.

Another object of the invention is to provide a private branch exchange in which, when an outgoing call is sent from an extension terminal to another extension terminal, an efficient connection to the other extension is performed if a called party is busy, etc.

A further object of the invention is to provide an exchange in which, when an outgoing call is sent from an extension terminal to another extension terminal, a plurality of extension numbers can be designated. All terminals, among the designated plurality of parties, that are capable of receiving the incoming call receive the call and a communication is established with an extension terminal that answers first, while the incoming calls to the other extensions are released at the moment the first answer is detected. By virtue of this arrangement, an extension will receive an incoming call from the extension terminal with greater probability, and an answer will be obtained from a called extension with greater probability. Accordingly, whenever a called party is busy or there is no answer, it is unnecessary to release the call each time and resend the call to the next terminal, as is required in the prior art.

Yet another object of the invention is to provide an exchange in which, when an outgoing call is sent from an extension terminal to another extension terminal, a plurality of party numbers are designated and a plurality of extensions capable of receiving the call exist among the plurality of parties, one of these extensions is selected and made to receive the incoming call. In accordance with this exchange, there is a greater probability that an extension will receive an incoming call from an extension terminal. Accordingly, whenever a called party is busy, it is unnecessary to release the call each time and re-send the call to the next terminal, as is required in the prior art.

Yet another object of the invention is to provide an exchange in which, when an outgoing call is sent from an extension terminal to another extension terminal, a plurality of party numbers are designated and a plurality of extensions capable of receiving the call exist among the plurality of parties, these extensions can be made to receive the call in regular order by changing over among them using a timer. In accordance with this exchange, there is a greater probability that an extension will receive an incoming call from an extension terminal, and a greater probability that an answer will be obtained from a called extension. Accordingly, whenever a called party is busy or there is no answer, it is unnecessary to release the call each time and re-send the call to the next terminal, as is required in the prior art.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a diagram showing an example of the format of an INFO message in the third embodiment;

FIG. 21 is a diagram showing an example of the format of an INFO message in the fourth embodiment;

FIG. 26 is an explanatory view showing the format of a set-up message;

FIG. 27 is an explanatory view showing a call-status storage table;

DESCRIPTION OF THE PREFERRED EMBODIMENTS

Figure 1:
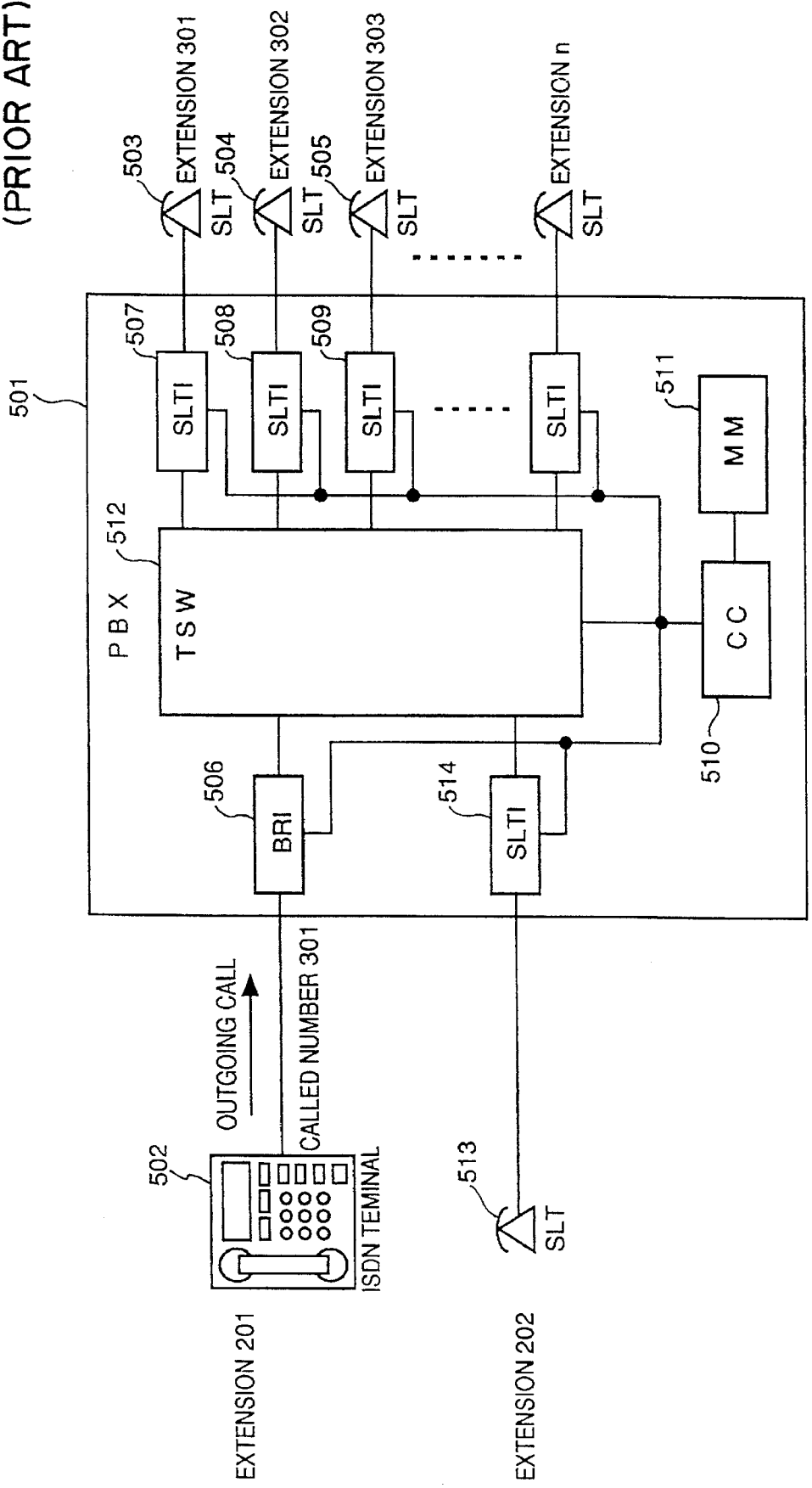
FIG. 1 is a block diagram showing a private branch exchange according to the prior art.
Figure 2:
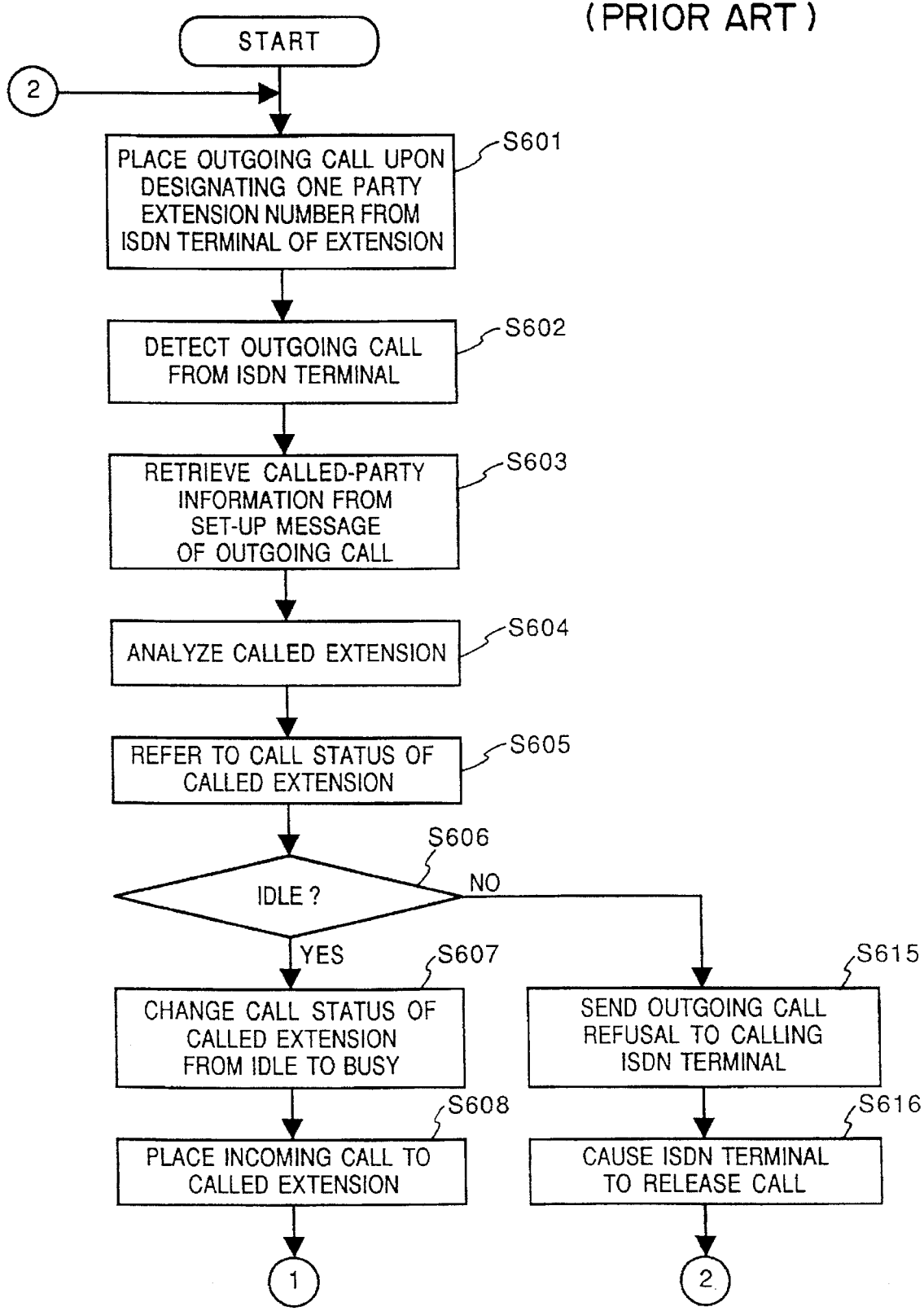
FIG. 2 is a flowchart showing the operation of the private branch exchange according to the prior art.
Figure 3:
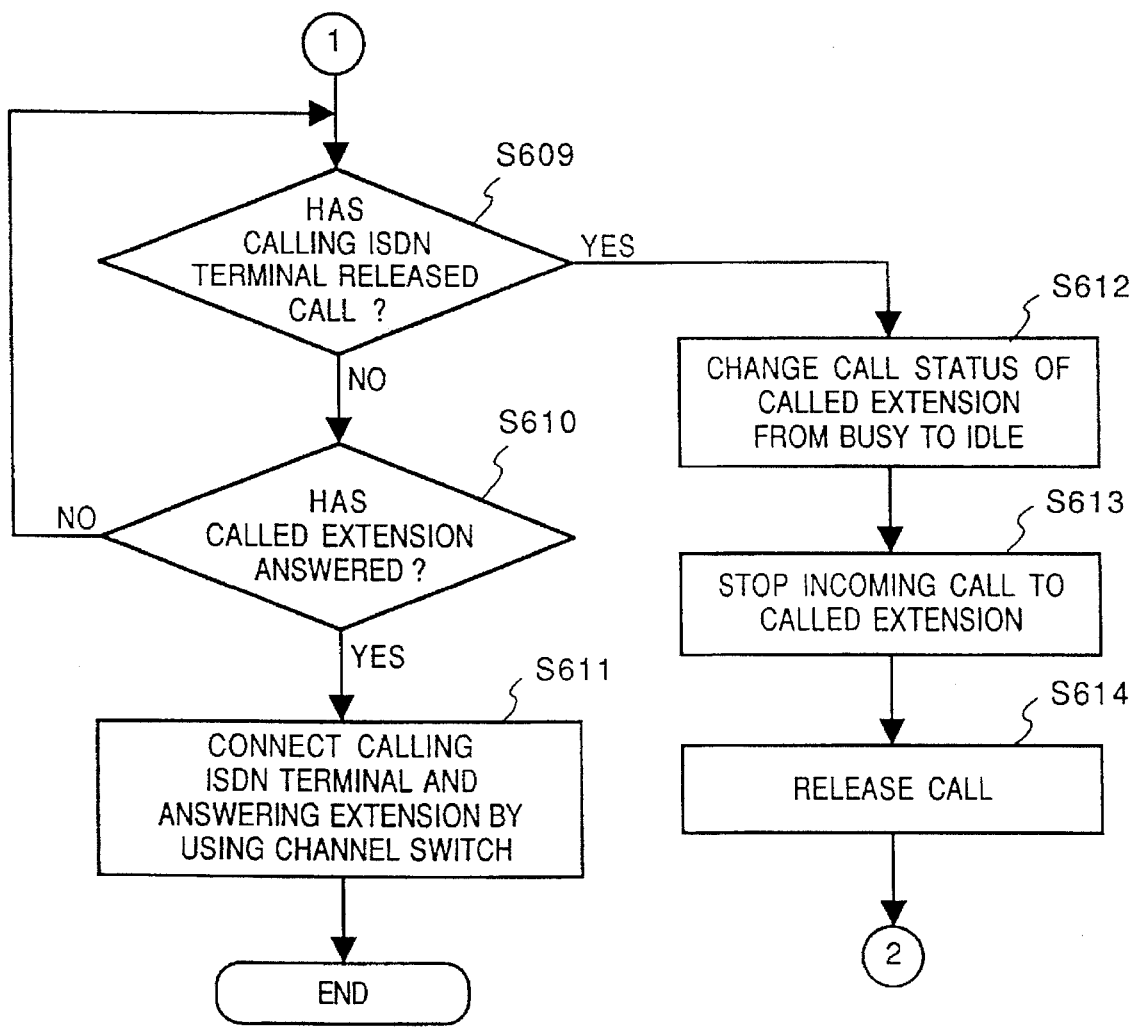
FIG. 3 is a flowchart showing the operation of the private branch exchange according to the prior art.

Eight (first through eighth) preferred embodiments of the present invention will now be described with reference to the accompanying drawings. An overview of the functions of the private branch exchange according to these embodiments is as follows:

i) A feature shared by the first through fourth embodiments is that a specific ISDN extension terminal can be set to a "call transfer mode", where when a terminal receives an incoming call, the call is transferred to a transfer destination (transfer address) assigned beforehand.

ii-1) The exchange of the first embodiment is capable of collectively designating, by a single extension number, a plurality of extension terminals as transfer destinations of an incoming call in a case where the call has arrived at an ISDN terminal.

ii-2) The exchange of the second embodiment is capable of placing an ISDN terminal in either of two modes. In the first mode, when an incoming call arrives at the ISDN terminal, the incoming call is transferred to one of a plurality of extension terminals designated in advance as a transfer destination (transfer address) of the incoming call. When the transfer-addressed terminal does not answer even when an attempt is made to transfer the incoming call thereto, the transfer destination is changed successively from one designated terminal to another (this operation shall be referred to as a "slide call" operation). The second mode is an ordinary extension transfer mode.

ii-3) The exchange of the third embodiment is capable of placing the ISDN terminal in any of three modes. In the first mode, when an incoming call arrives at the ISDN terminal, an "answer message" is played back for the calling party to hear and a message from the calling party is recorded. In the second mode, the aforesaid slide call operation is executed when an incoming call arrives at the ISDN terminal. The third mode is an ordinary extension transfer mode.

ii-4) The exchange of the fourth embodiment is capable of placing the ISDN terminal in any of three modes. In the first mode, when an incoming call arrives at the ISDN terminal, a designated "answer message" can be played back for the calling party to hear. In the second mode, the aforesaid slide call operation is executed when an incoming call arrives at the ISDN terminal. The third mode is an ordinary extension transfer mode.

iii) A feature shared by the first through fourth embodiments is that the exchange of the invention is capable of determining the mode to which a call-receiver ISDN extension terminal has been set, as well as the transfer-addressed telephone number, etc. The determination is made based upon a message from the ISDN terminal.

iv) The fifth through eighth embodiments relate to a "shift call" between extension terminals.

iv-1) The fifth embodiment is characterized in that the extension numbers of a plurality of terminals that are shift-called are marked off by "*", whereby they can be identified by the controller of the exchange.

iv-2) The sixth embodiment is characterized in that when the extension numbers of a plurality of terminals to be shift-called differ only in terms of their last digits (e.g., "301", "302", "303"), these terminal numbers are designated solely by a combination of their common digit values and a sequence of their last digit values (e.g., "30123").

iv-3) The seventh embodiment relates to a transmission sequence in which when a plurality of terminals are shift-called, it is determined to which of the terminals the call is transmitted first. For example, the call is transmitted to the extension having the smallest (lowest) extension number.

iv-4) The eighth embodiment is characterized in that when a plurality of terminals are shift-called, a call is placed to these terminals in regular order at fixed time intervals and this repetitive calling is continued until any one of the terminals answers.

In this specification, the "slide call" in the first through fourth embodiments refers to an operation in which, when a call-receiver terminal receives an incoming call, it is prearranged at the call-receiver terminal for the call to be successively transferred by being made to "slide" from one terminal to the next. The "shift call" refers to an operation in which the call-originator terminal is set so as to "shift" an outgoing call among a plurality of terminals when the call originates.

First Embodiment

Figure 4:
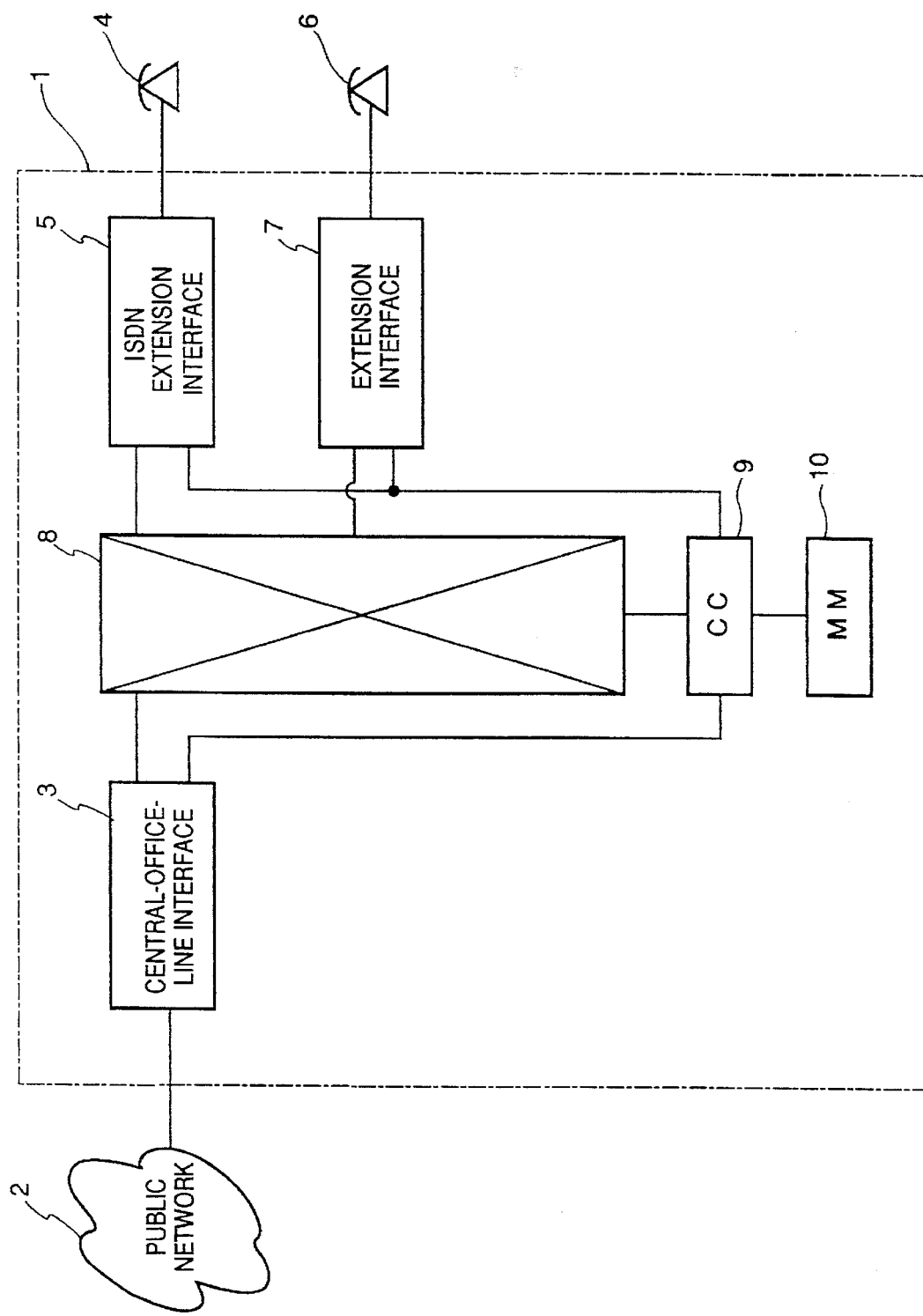
FIG. 4 is a block diagram showing the system configuration of a private branch exchange according to a first embodiment of the present invention.

FIG. 4 is a block diagram showing the configuration of system having a private branch exchange 1 according to a first embodiment of the present invention.

The private branch exchange (PBX) 1 has a line-wire interface 3 connected to a public network 2, an ISDN extension interface 5 connected to a plurality of ISDN terminals 4, an extension interface 7 connected to an analog extension terminal 6, a channel switch 8 for performing channel switching, a communication controller (CC) 9 for supervising overall control of the PBX 1, and a memory (MM) 10 for storing various programs and data.

Figure 5:
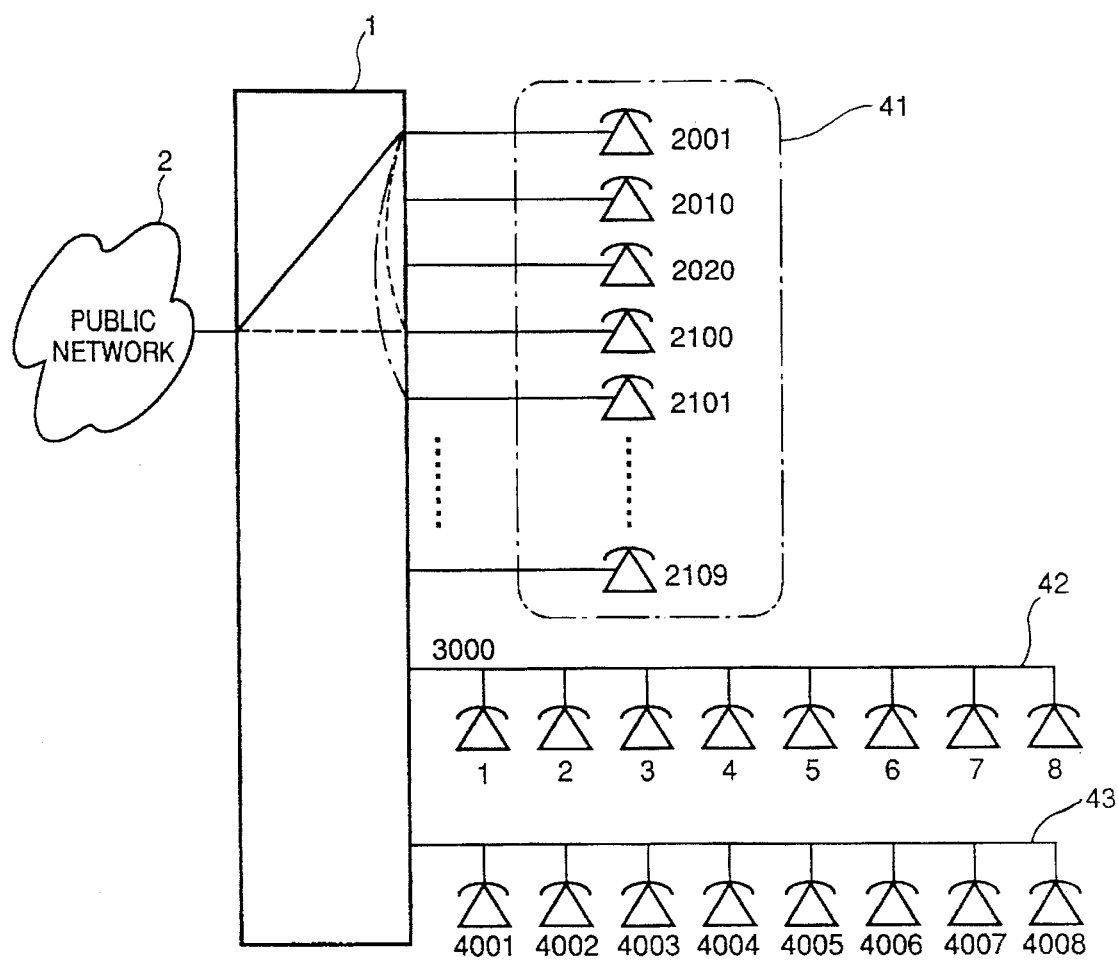
FIG. 5 is a block diagram, which shows an example of connections between a private branch exchange and extension terminals, for describing the first embodiment.

FIG. 5 is a system block diagram, which shows an example of connections between the private branch exchange 1 and ISDN extension terminals, for describing the system of the first embodiment in greater detail. These ISDN terminals are connected to the ISDN extension interface. It should be noted that the analog extension terminal is not shown in FIG. 5.

In FIG. 5, a group of terminals having individual extensions and terminal groups 42, 43 each connected to one extension are connected to the exchange 1. An extension terminal group 41 is a set of terminals connected to ISDN extensions accommodated as separate extensions. The extension terminal groups 42, 43 are ISDN terminals connected by bus to the ISDN extension interface 5.

In the ISDN extension terminal group 42, one extension number (3000) is assigned to the plurality of ISDN extension terminals. By designating this extension number (3000) and a subaddress (having a value of 1-8), any one call-receiver terminal in the ISDN extension terminal group 42 can be specified.

In the ISDN extension terminal group 43, extension numbers (4001-4008 in regular order) are assigned to respective ones of the plurality of ISDN terminals.

Figure 6:
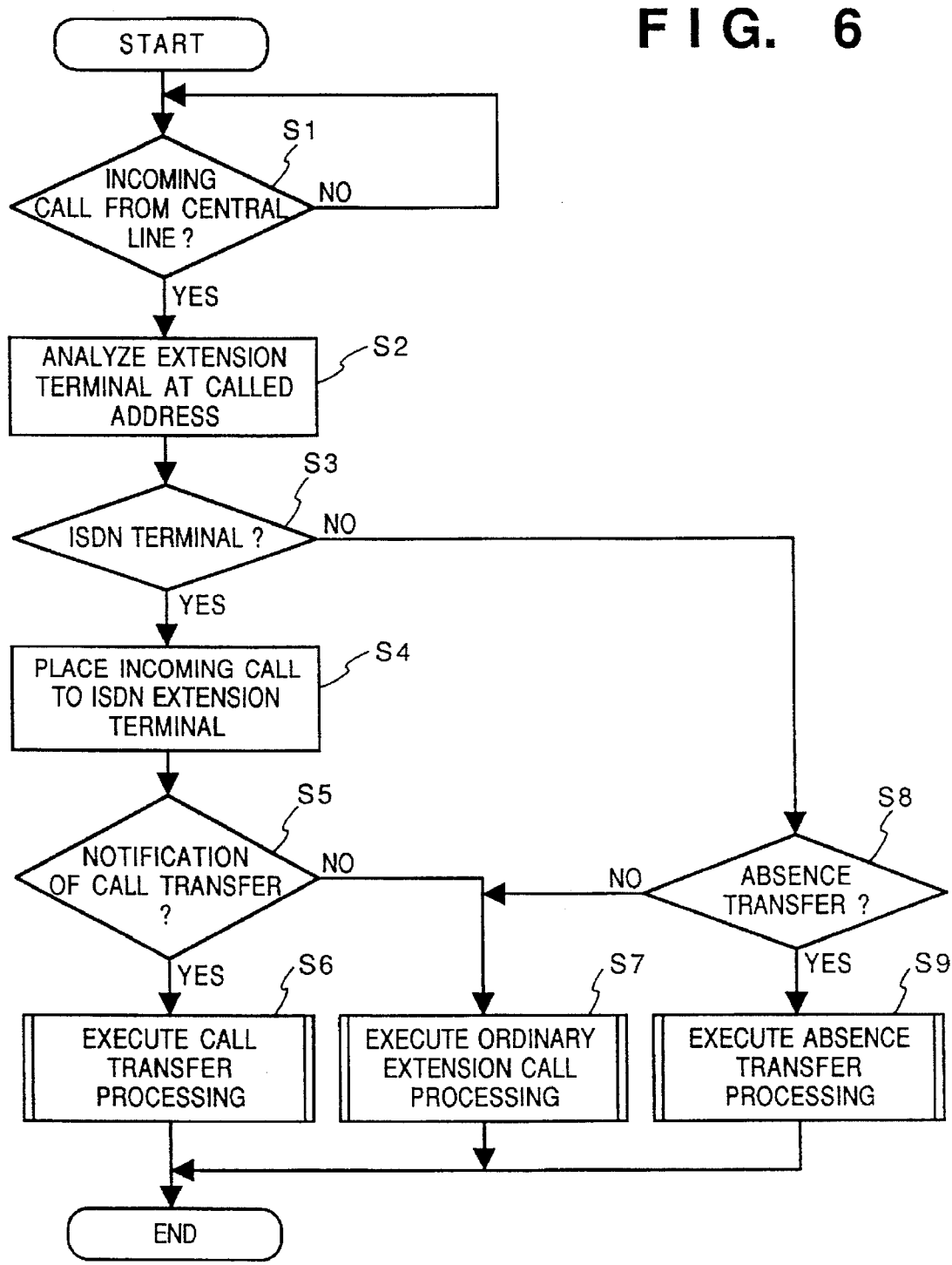
FIG. 6 is a flowchart showing a control operation at reception of an incoming call in the private branch exchange of the first embodiment.
Figure 8:
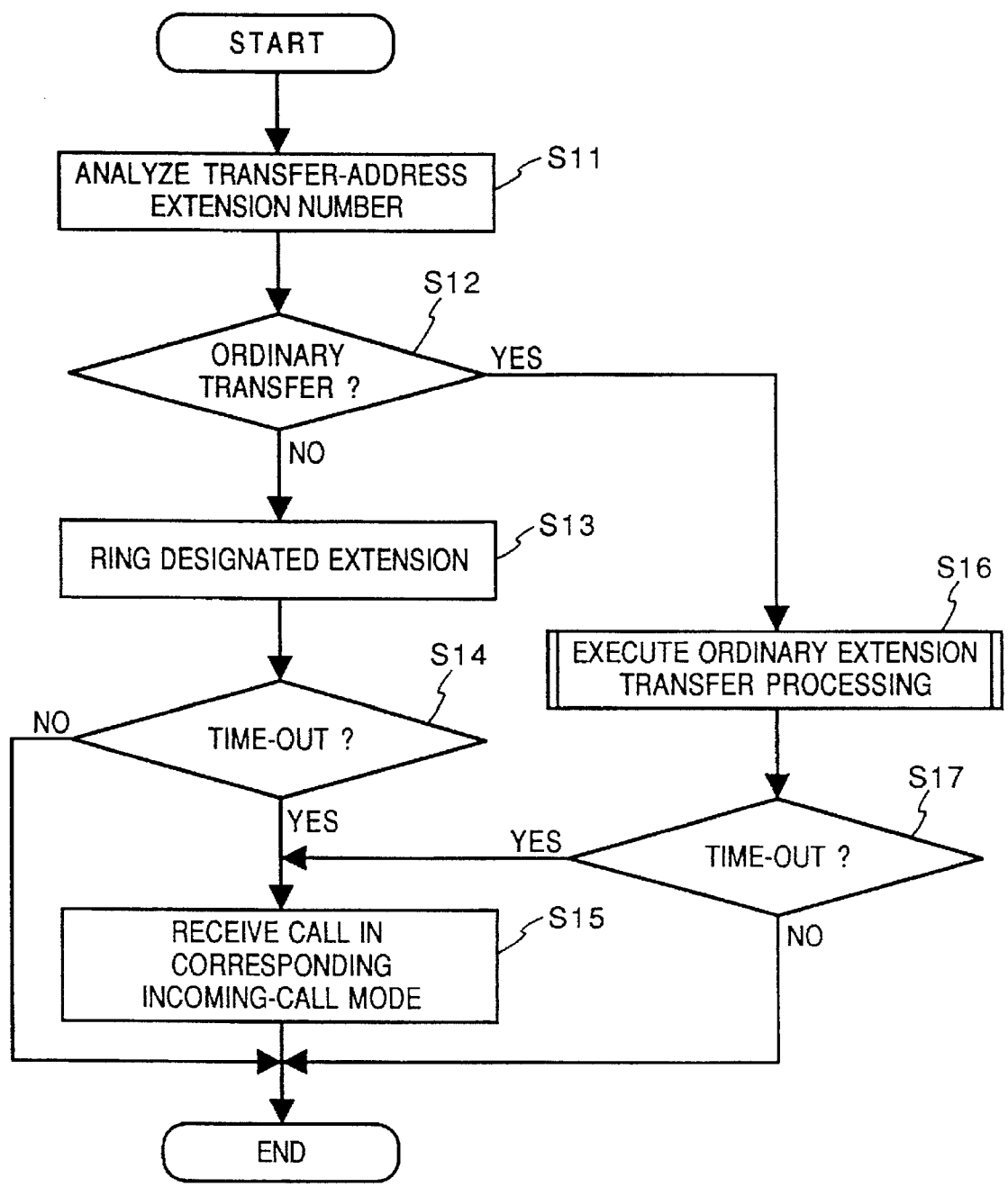
FIG. 8 is a flowchart showing call transfer processing in the private branch exchange of the first embodiment.
Figure 9:
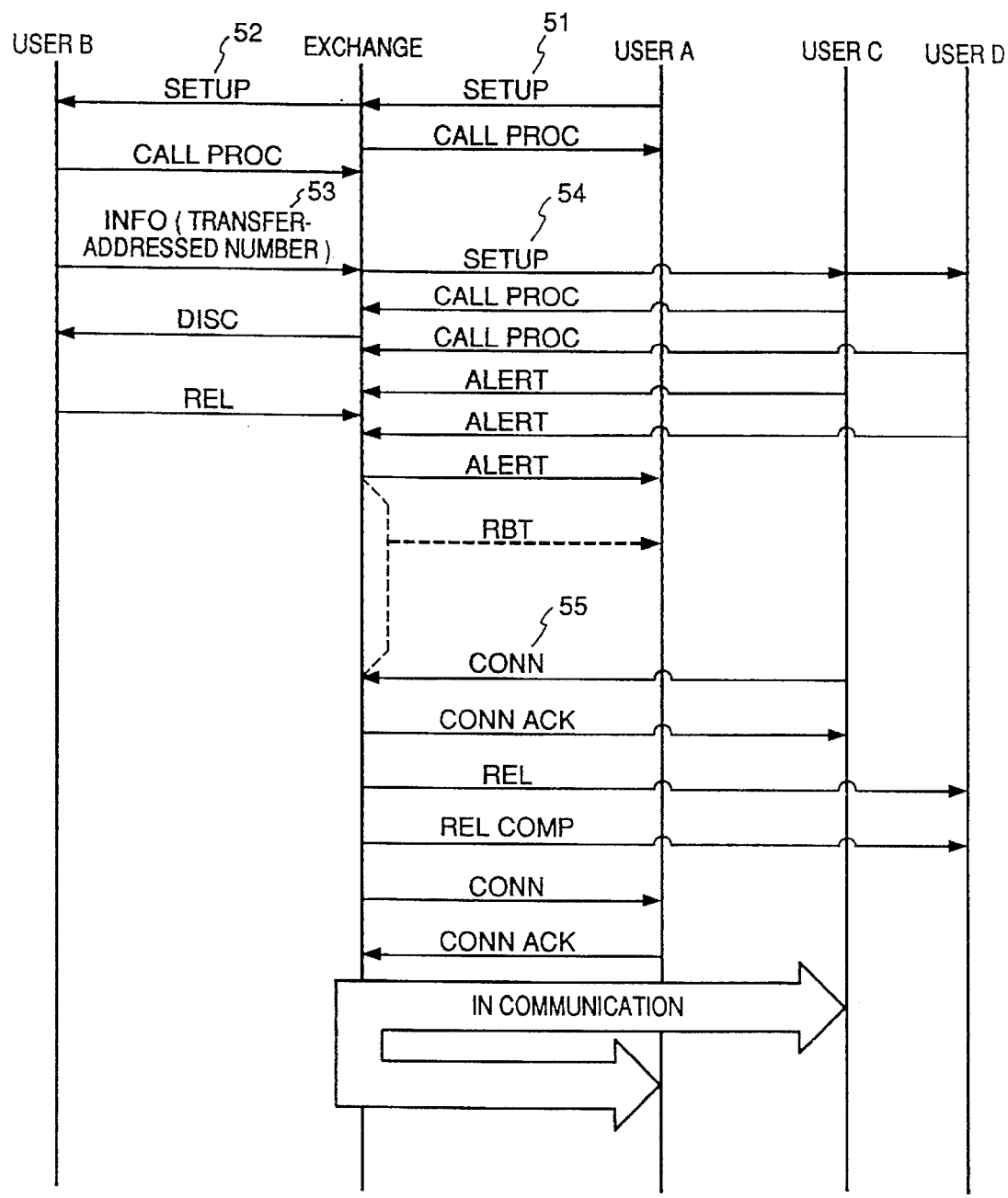
FIG. 9 is an explanatory view showing an example of a communication sequence in the private branch exchange of the first embodiment.

FIG. 6 is a flowchart showing a procedure for controlling the operation of the private branch exchange 1 of the first embodiment, and FIG. 8 is a flowchart showing the details of "call transfer processing" of step S6 in the control procedure of FIG. 6. FIG. 9 is useful in acquiring a better understanding of the control procedures shown in FIGS. 6 and 8. Though the terminals of users A–D are all ISDN terminals, the terminal of user A need not necessarily be an extension terminal.

At step S1 in FIG. 6, the line-wire interface 3 waits for an incoming call via a line wire. In FIG. 9, it is assumed that a set-up message (SETUP) 51 from the user A has been sent to the exchange 1. When this message is detected by the line-wire interface 3 at step S1, the line-wire interface 3 transmits the set-up message to the communication controller 9. At step S2 the communication controller 9 analyzes the set-up message in accordance with a characteristic call-response method set for the line wire and decides the terminal (user B in the example of FIG. 9) that is to receive the call.

The controller 9 detects the attribute of the call-receiver ISDN terminal (user B in the example of FIG. 9) at step S3.

In a case where the detected attribute is that of an ISDN terminal (a YES decision at step S3), the set-up message (SETUP 51 in the example of FIG. 9) is transferred to the ISDN extension interface 5 accommodating this terminal (user B in the example of FIG. 9). Upon receiving this message, the ISDN extension interface 5 transmits the set-up message (SETUP 52 in the example of FIG. 9) to one terminal (user B in the example of FIG. 9) of the call-receiver ISDN terminal group 41 at step S4.

It is determined at step S5 whether the call-receiver ISDN terminal (user B in the example of FIG. 9) has been set to the "call transfer mode". This determination is made by having the interface 5 examine whether the call-receiver ISDN terminal (user B) has been set to the "call transfer mode".

It will be assumed here that the call-receiver ISDN terminal (user B) has been set to the call transfer mode. In such case, the call-receiver ISDN terminal (user B) answers the set-up message that has been sent by the controller 9 at step S4 and transmits a message (an INFO message 53 in the example of FIG. 9), which includes the call-receiver number, to the ISDN extension interface 5. The latter sends the received message (INFO) to the controller 9. As a result of receiving the INFO message, the controller 9 is capable of determining at step S5 whether the call-receiver terminal has been set to the call transfer mode. If the call-receiver terminal has been set to the call transfer mode, then call transfer processing is executed at step S6. The details of call transfer processing are illustrated in FIG. 8.

If it is determined at step S5 that the call-receiver ISDN terminal (user B) has not been set to the call transfer mode, then the controller 9 executes ordinary extension processing (this control procedure is well known and need not be illustrated here) at step S7 in such a manner that the ISDN terminal (user B) answers the set-up message (SETUP 52) and performs ordinary extension incoming-call processing.

If it is found at step S3 that the attribute of the call-receiver terminal (user B in the example of FIG. 9) is not that of an ISDN terminal, i.e., that the call-receiver terminal is one of the analog extension terminals 6, the controller 9 determines at step S8 whether this analog extension terminal has been registered as an absence call-receiver number in the internal memory 10 of the exchange. If it has been registered as an absence transfer number, then absence transfer processing is executed at step S9. If this analog extension terminal has not been registered as an absence transfer number, then the controller 9 executes ordinary extension incoming-call processing in such a manner that the analog extension terminal itself answers the incoming call.

Next, the call transfer processing of step S6 will be described in accordance with FIG. 8.

Upon receiving (step S5) the message (INFO 53 in the example of FIG. 9), inclusive of the data such as the transfer-addressed telephone number, from the ISDN interface 5, the controller 9 analyzes the transfer-addressed number contained in the message at step S11 in FIG. 8.

Figure 7:
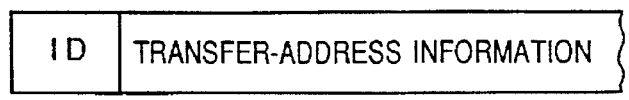
FIG. 7 is a diagram showing an example of the format of an INFO message in the first embodiment.

In this embodiment, it is assumed that the INFO message has a format of the kind shown in FIG. 7. As shown in FIG. 7, the INFO message has an "identifier (ID)" field, which indicates that the message includes transfer-address information, and a "transfer-address information" field. A code to be stored in the ID field can be set at will on the terminal side. A numeral or a symbol such as "*" entered by a ten-key pad on the terminal side can be inserted in the transfer-address information field.

Based upon the results of analysis performed at step S5, the controller 9 determines whether the transfer desired by the user is an ordinary transfer or the like. Here an "ordinary transfer" is an incoming call transfer that designates one transfer destination (address). In a case where the requested call transfer is an "ordinary transfer" (for example, a case in which the transfer destination is the extension terminal having the extension number "2010" in FIG. 5), the controller 9 performs ordinary extension transfer processing at step S16 so that the extension terminal of this transfer destination will answer the incoming call. In a case where the controller 9 detects a time-out at step S17 because the extension terminal of this transfer destination has not answered, the controller 9 executes incoming-call processing (step S15) in accordance with the corresponding incoming-call mode (e.g., a call distributing mode, a call centralizing mode or a call-to-attendant console mode) set for the terminal group to which this transfer-addressed terminal belongs.

Next, a case will be described in which the result of analysis performed at step S11 indicates that the call-receiver terminal has not been set to the ordinary transfer mode. This case is one in which a plurality of transfer-addressed extension numbers have been designated. More specifically, this is a case in which a plurality of transfer destinations have been designated collectively. This "collective designation of transfer destinations" means registering a plurality of transfer-address numbers en masse in accordance with a setting method designated by the system. For example, by storing "210*" in the transfer-address information field of FIG. 7, ten extensions of numbers 2100~2109 are registered. Here the symbol "*" represents that the last digit is any numeral.

At step S13, the controller 9 transmits a set-up message to all terminals of the ISDN extension interface 5 accommodating a designated transfer-addressed extension terminal (any one of the numbers 2100–2109 in the example of FIG. 5). This set-up message is SETUP 54 in the example of FIG. 9. All terminals that have received this message will be caused to ring by the message. At the moment one (user C in the example of FIG. 9) of the transfer-addressed extension terminals that are ringing answers (CONN 55 in the example of FIG. 9), call transfer processing is concluded. As a result, communication is established between users A and C in the example of FIG. 9.

A case in which none of the ringing terminals answers is possible. In such case, a time-out is sensed at step S14. When a time-out has been sensed, the incoming call is received at step S15 in accordance with the incoming-call mode (e.g., the call distributing mode, call centralizing mode or call-to-attendant console mode) set in advance for the terminal group to which the transfer-addressed terminal belongs.

In the first embodiment set forth above, it is described that ISDN terminals are used for the call-originator terminal (user A), the call-transferrer terminal (user B), the transfer-addressed terminal (user C) and the transfer-addressed terminal (user D). However, terminals other than the call-transferrer terminal (user B) may be analog terminals other than ISDN terminals. In other words, it is necessary only that the call-transferrer terminal (user B) be an ISDN extension terminal. Further, the call-originator terminal (user A) may be one accommodated by an extension of the private branch exchange.

In a case where the transfer-addressed extension terminal has the form of the extension terminal group 42 of FIG. 5 in the first embodiment, it is possible to simultaneously ring extension terminals whose subaddress numbers are 1~8 if "300*" is registered as the transfer-addressed extension number.

In a case where the transfer-addressed extension terminal has the form of the extension terminal group 43 of FIG. 5 in the first embodiment, it is possible to simultaneously ring extension terminals whose subaddress numbers are 4001~4008 if "400*" is registered as the transfer-addressed extension number.

Further, if 2010, 2020 . . . are registered as a plurality of extension numbers, this will make it possible to simultaneously ring the corresponding extension terminals.

Second Embodiment

Figures 10, 11:
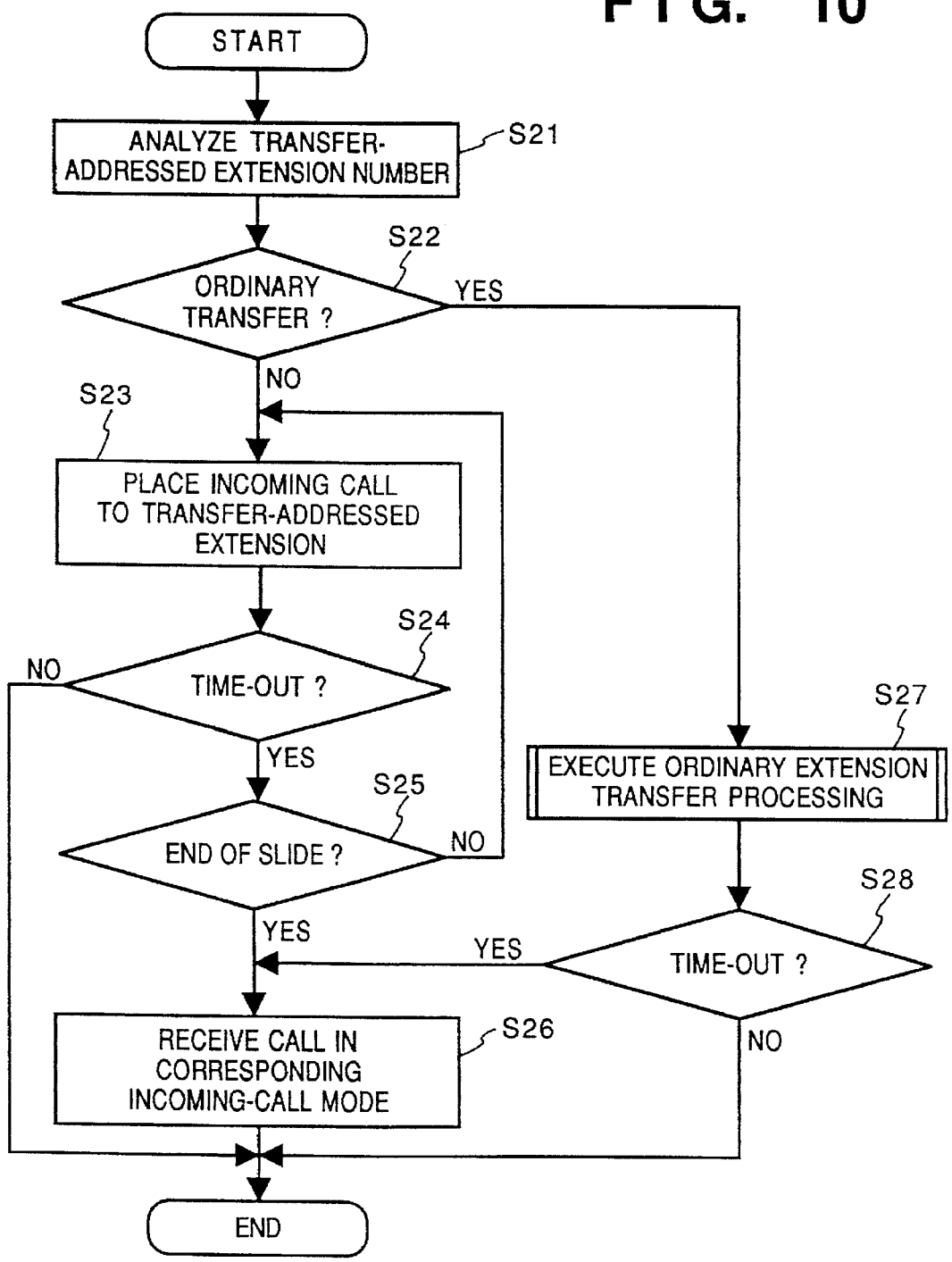
FIG. 10 is a flowchart showing call transfer processing in the private branch exchange of the second embodiment.
FIG. 11 is a diagram showing an example of the format of an INFO message in the second embodiment.
Figure 12:
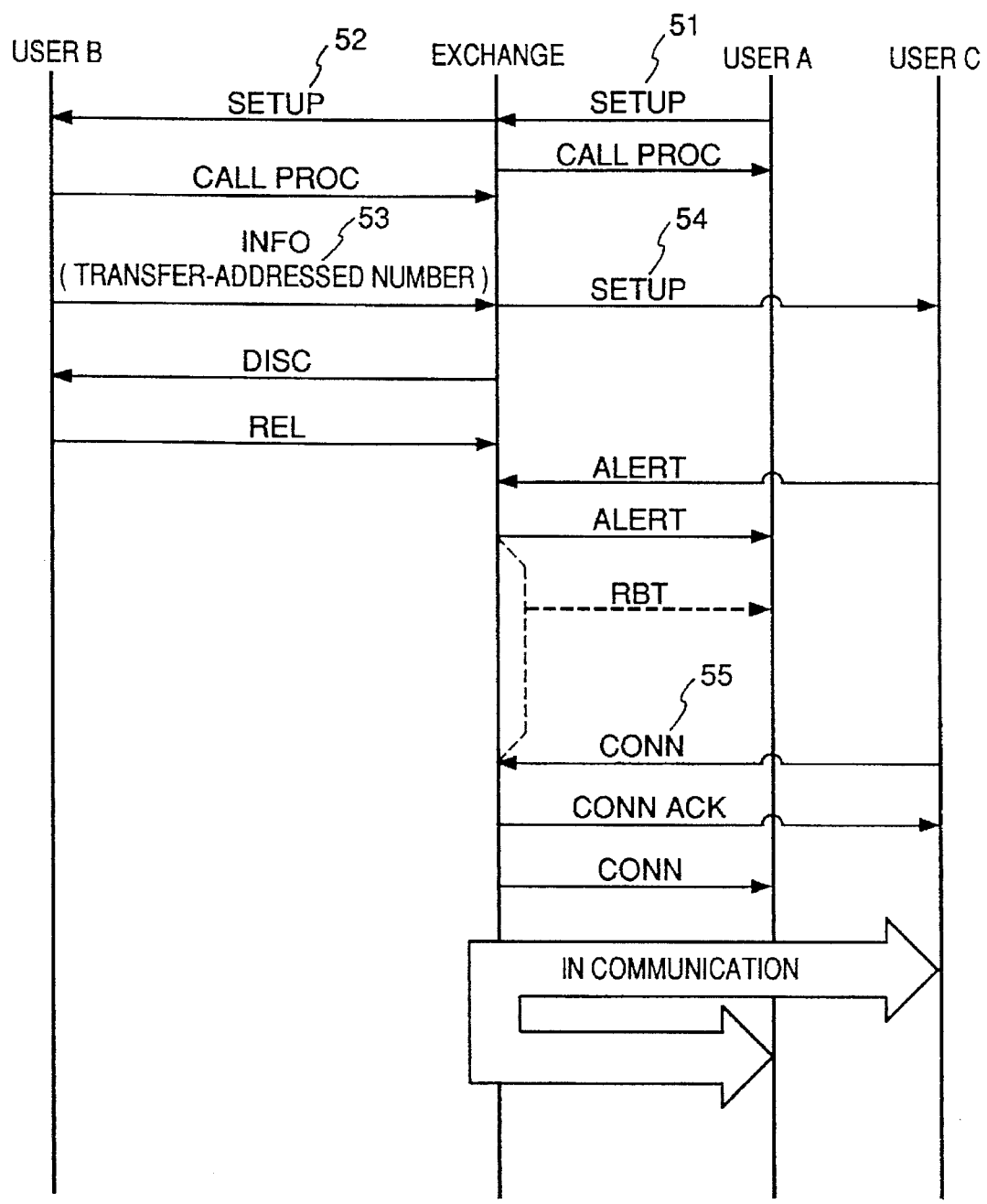
FIG. 12 is an explanatory view showing an example of a communication sequence in the private branch exchange of the second embodiment.

A second embodiment of the invention will now be described. In the first embodiment, a plurality of transfer destinations are designated collectively by one item of transfer-address information. In the second embodiment, however, transfer-addressed extension numbers are designated in a plurality of sets, as illustrated in FIG. 11. Even if there is no answer from an extension terminal to which a call has been transferred (i.e., even if the user does not answer at this terminal), designating a plurality of sets makes it possible for the call to be sent to the remaining designated terminals one after another. According to this embodiment, it is just as if the user who has performed the incoming-call transfer setting operation is pursued by the incoming call. Since the main difference between the first and second embodiments is the incoming-call transfer processing, the second embodiment will be described while referring to FIGS. 4 through 6 of the first embodiment. With regard to the call transfer processing of the second embodiment, this will be described to the flowchart of FIG. 10 illustrating the call transfer processing and the explanatory view of FIG. 12 illustrating the communication sequence. It is assumed that the terminals of the users A through C in FIG. 12 are all ISDN terminals.

The call transfer processing of FIG. 10 will now be described. In order to simplify the description, the description will start from the point at which the exchange 1 is notified (step S5 in FIG. 6), by the call-receiver terminal (an ISDN terminal), of the mode to which this terminal has been set. In other words, the description will start from the "call transfer processing" of step S5. Furthermore, it is assumed in the second embodiment also that messages between the call-receiver terminal and the exchange have the format shown in FIG. 7.

Upon receiving a message (INFO 53 in the example of FIG. 12), which includes the transfer destination, from the ISDN interface 5, the communication controller 9 analyzes the transfer-address number contained in this message at step S21 in FIG. 10. If the result of analysis is that the transfer-address number designates one extension terminal (e.g., "2010" shown in FIG. 5), then the designated terminal answers the incoming call and ordinary extension transfer processing is executed (step S27). In a case where the controller 9 detects a time-out at step S28 because this designated extension terminal has not answered, the controller 9 executes incoming-call processing (step S26) in accordance with the corresponding incoming-call mode (e.g., the call distributing mode, call centralizing mode or call-to-attendant console mode) of the group to which this transfer-addressed terminal belongs.

On the other hand, if the result of the analysis at step S21 is that a plurality (see FIG. 11) of extension numbers serving as transfer destinations have been designated in the message from the call-receiver terminal, the controller 9 makes a NO decision at step S22 and, at step S23, sends the set-up message (SETUP 54 in the example of FIG. 12) to the ISDN extension interface 5 accommodating one designated transfer-addressed extension terminal. Here designating a plurality of transfer destinations necessitates designating a plurality of locations when, say, the whereabouts of the person cannot be determined. More specifically, 2100, 2101 . . . , etc., are designated.

A case will now be described in which the controller 9 detects a time-out at step S24 because the transfer-addressed extension terminal has not answered. In this case, it is verified at step S25 whether there is an extension terminal other than a terminal for which time has run out among the transfer-addressed terminals designated. If such an extension terminal exists, a slide is effected to this other extension terminal and the set-up message is transmitted to this extension terminal.

As long as time runs out while a designated transfer-addressed extension terminal exists, the processing of steps S23–S25 is repeated. This operation is referred to as a "slide call" operation, as mentioned earlier. If any of the extension terminals answers (CONN 55 in the example of FIG. 12) during this repeated execution of processing, the call transfer processing is concluded and users A, B are capable of communicating with each other.

If none of the extension terminals replies to SETUP (YES at step S25) even if the "slide call" operation is applied to all extension terminals designated as transfer destinations, the controller 9 executes incoming-call processing (step S26) in accordance with the incoming-call mode (e.g., the call distributing mode, call centralizing mode or call-to-attendant console mode) of the group to which the designated transfer-addressed terminal belongs.

In the second embodiment set forth above, it is described that ISDN terminals are used for the call-originator terminal (user A), the call-transferrer terminal (user B) and the transfer-addressed terminal (user C). However, terminals other than the call-transferrer terminal (i.e., the call-receiver terminal) (user B) may be analog terminals other than ISDN terminals. In other words, it is necessary only that the call-transferrer terminal (user B) be an ISDN extension terminal. Further, the call-originator terminal (user A) may be one accommodated by an extension of the private branch exchange.

In a case where the transfer-addressed extension terminal has the form of the extension terminal group 42 of FIG. 5 in the second embodiment, it is possible to specify transfer-addressed terminals by designating "3000" and subaddresses of 1–8 as the transfer-addressed extension numbers.

In a case where the transfer-addressed extension terminal has the form of the extension terminal group 43 of FIG. 5 in the second embodiment, it is possible to specify transfer-addressed extension terminals by designating 4001–4008 as subaddresses.

Third Embodiment

A third embodiment of the present invention will now be described. As set forth earlier, the exchange of the third embodiment makes it possible for an ISDN terminal to be set to the "slide call" function or a function for recording the message of a party.

Figure 13:
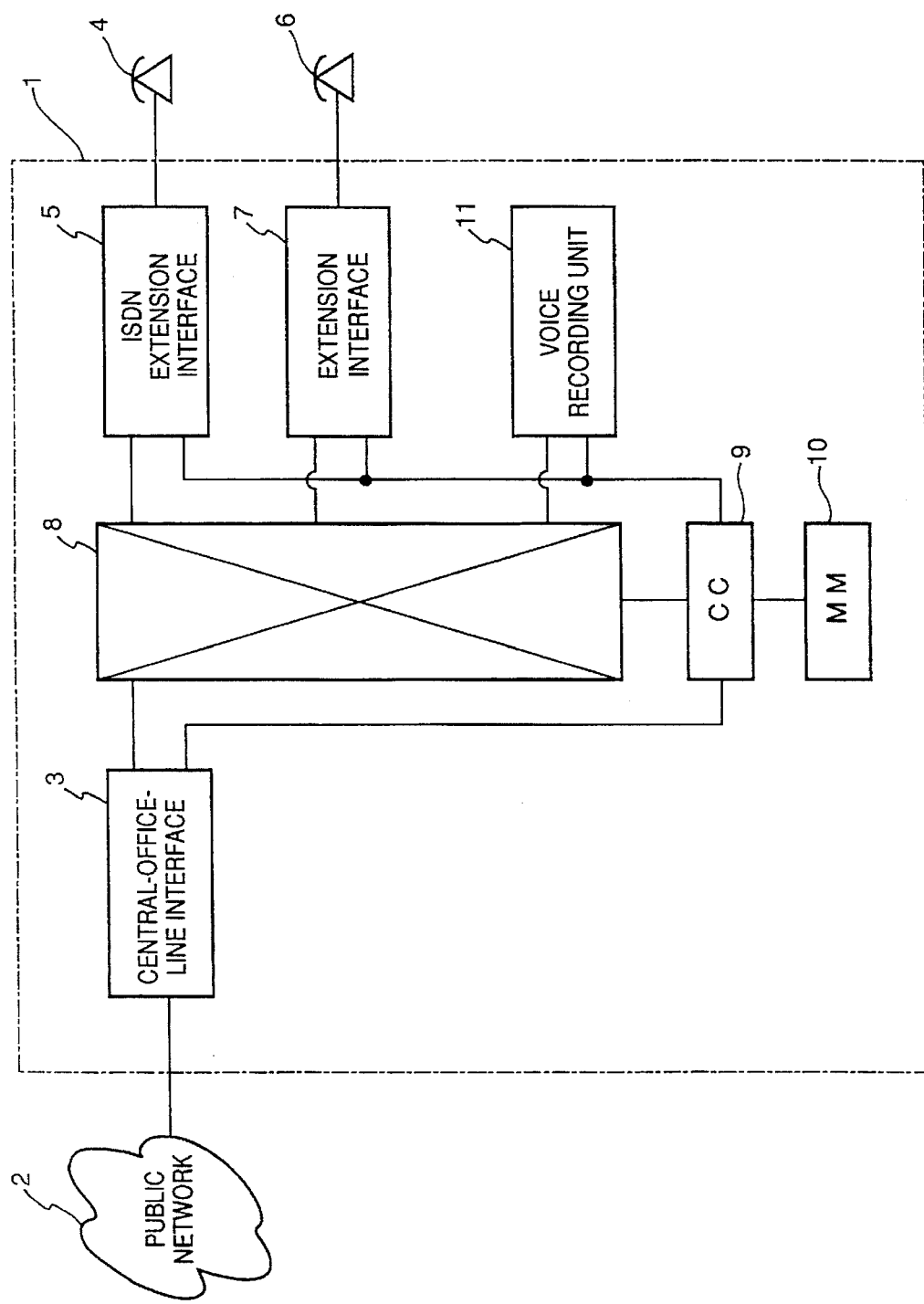
FIG. 13 is a block diagram showing the system configuration of a private branch exchange in a third embodiment of the present invention.

FIG. 13 is a block diagram showing the system configuration of the private branch exchange 1 in the third embodiment of the present invention. As shown in FIG. 13, the third embodiment has a voice recording unit 11 in addition to the components of the first embodiment.

Figure 14:
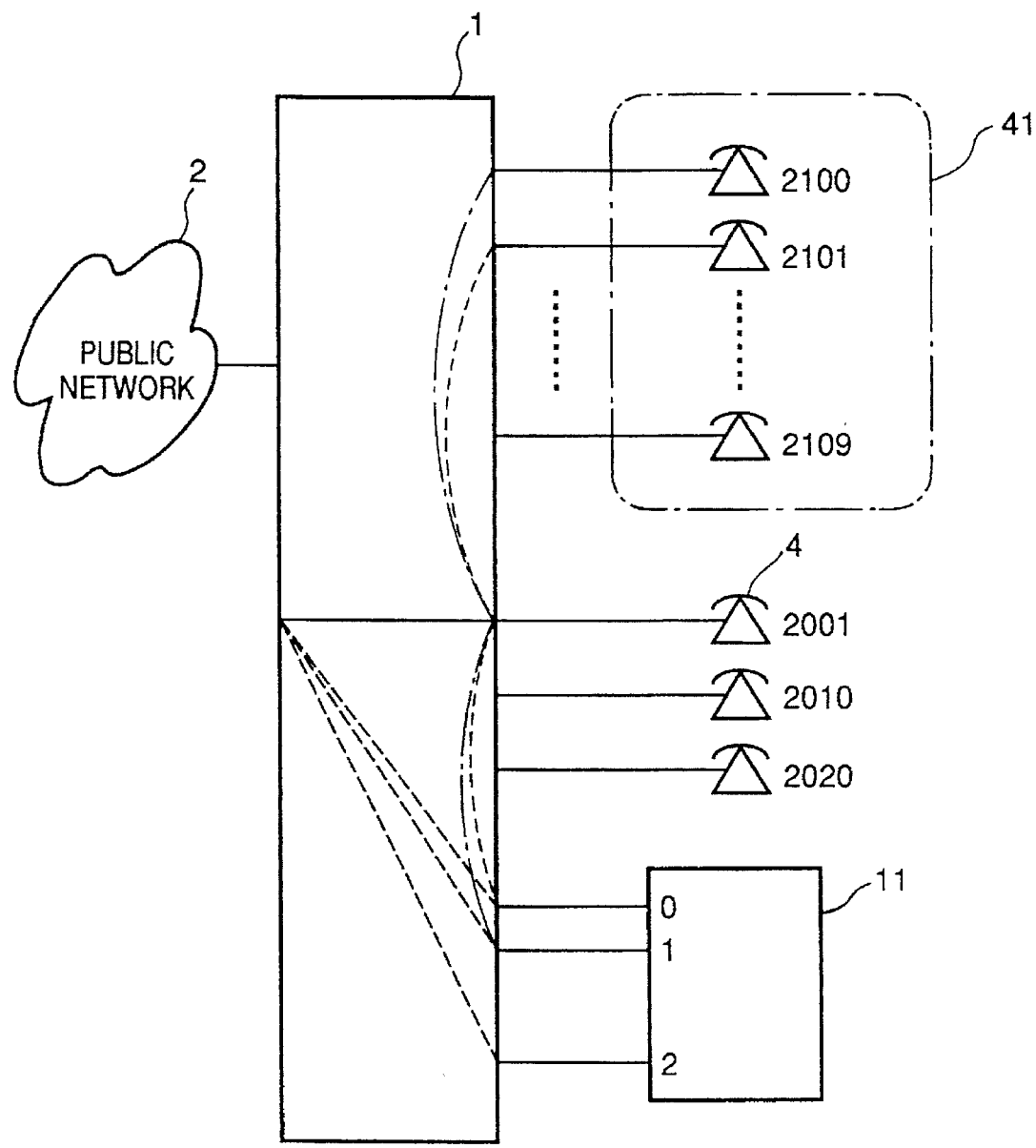
FIG. 14 is a block diagram, which shows an example of connections between a private branch exchange and extension terminals, for describing the third embodiment.

FIG. 14 is a block diagram, which shows an example of connections between the private branch exchange 1 and a group of extension terminals, for describing the third embodiment. Components identical with those of FIG. 5 are designated by like reference numerals. The voice recording unit 11 has two voice playback channels of channel numbers "0" and "1", and one voice recording channel of channel number "2".

FIG. 16 is a diagram showing the format of an INFO message exchanged by the exchange and the ISDN terminals in the third embodiment. The first field of the message is an identifier field $ID_1$ that indicates whether the function for recording the message of a party is to be started or not. The next field is a field that designates a channel for recording the message of the party, and this is followed by a field for designating a channel that is to play an answer message. The next field is for storing the answer message to be played prior to recording, and this is followed by an identifier field ID2 indicating whether a slide call is to be performed or not. This is followed by a plurality of transfer-addressed extension numbers.

Figure 15:
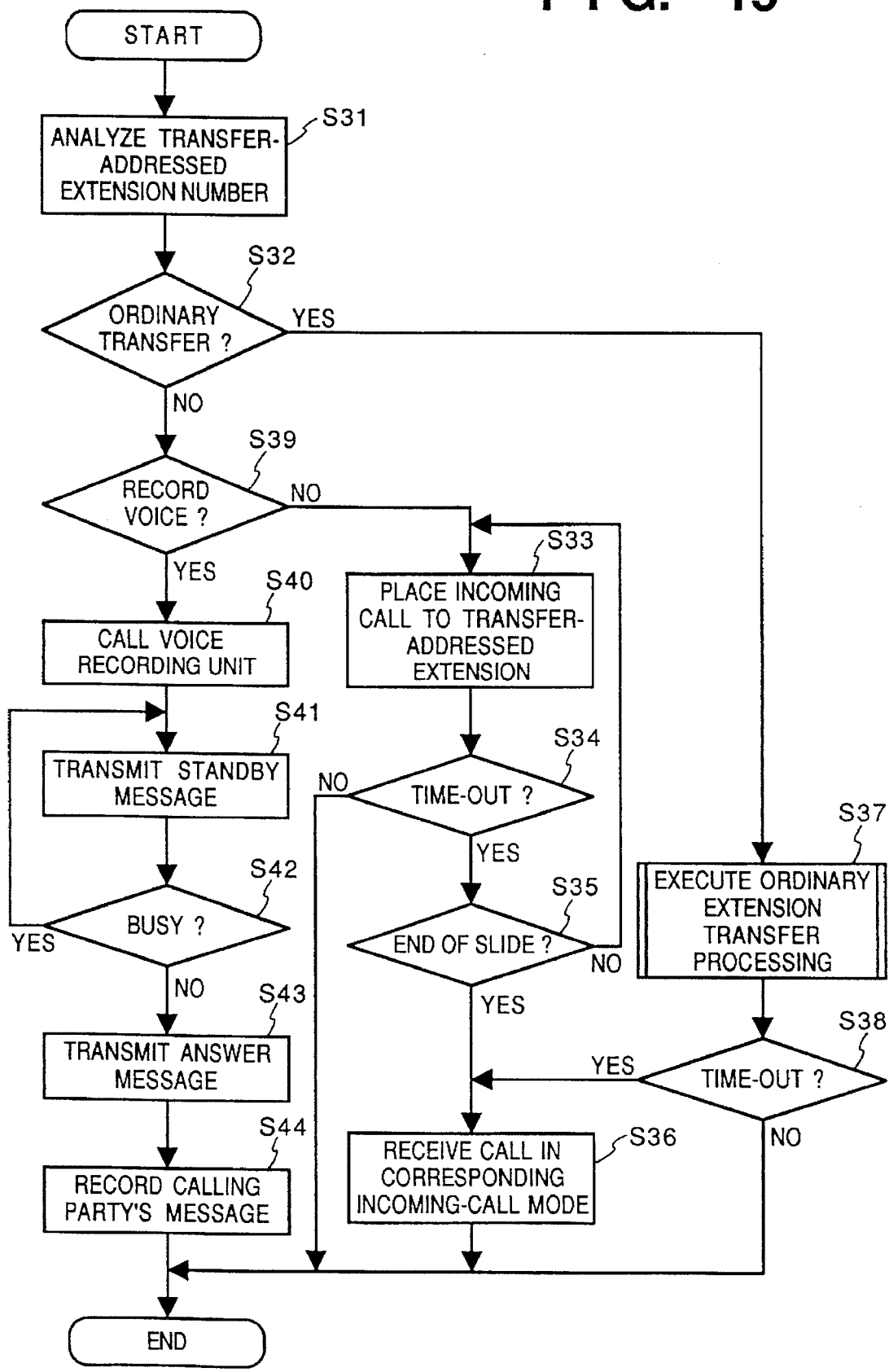
FIG. 15 is a flowchart showing call transfer processing in the private branch exchange of the third embodiment.
Figure 17:
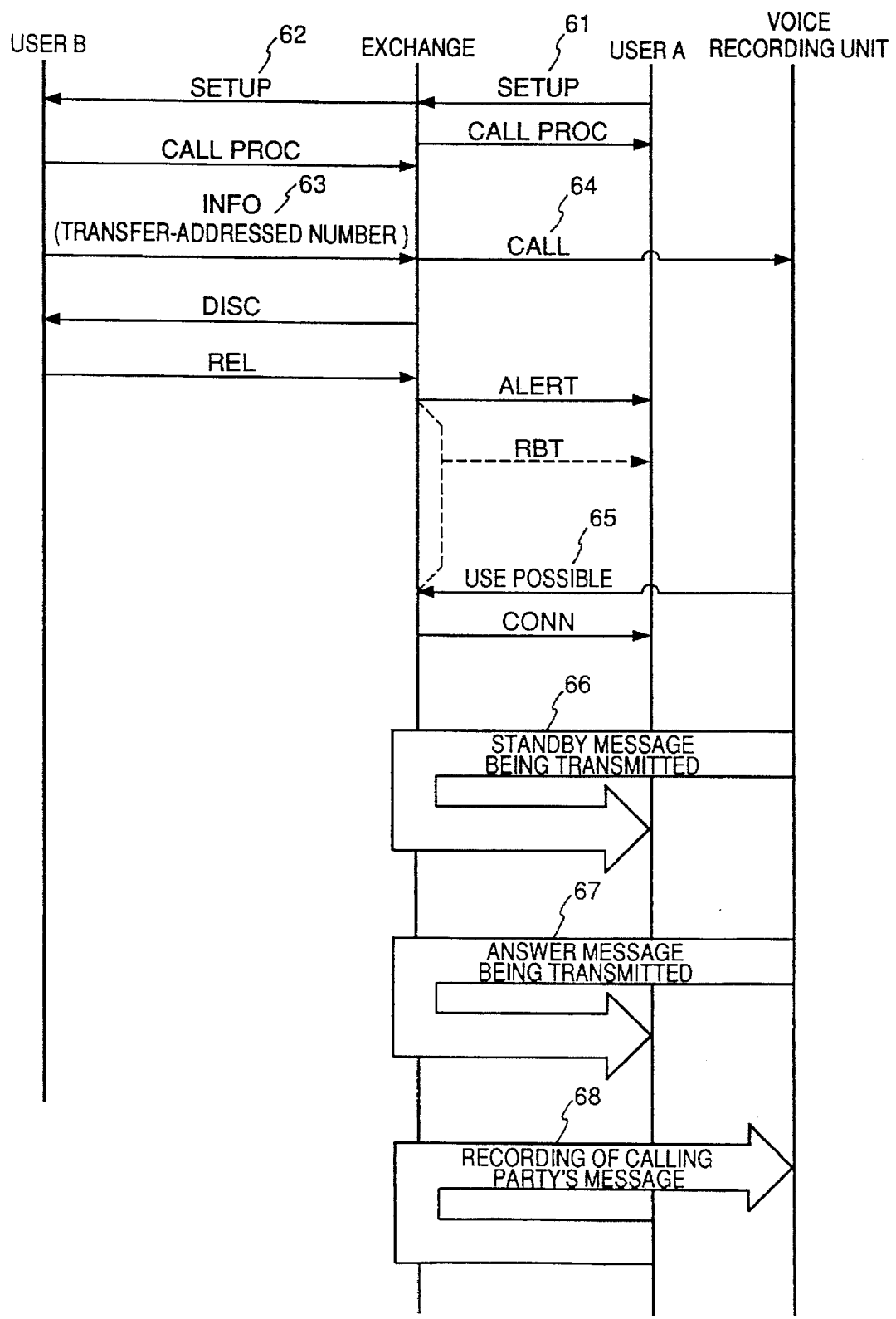
FIG. 17 is an explanatory view showing an example of a communication sequence in the private branch exchange of the third embodiment.

FIG. 15 is a flowchart showing the control procedure of call transfer processing according to the third embodiment, and FIG. 17 is a view for describing an example of a communication sequence in the third embodiment. The overall operation at the time of an incoming call according to the third embodiment is assumed to be the same as that of the first embodiment (FIG. 5). In FIG. 17, the terminals of users A, B are both assumed to be ISDN terminals.

The control procedure of call transfer processing according to the third embodiment will now be described in accordance with FIG. 15. For the sake of simplicity, however, the description will start from the point at which the exchange 1 is notified (step S5 in FIG. 6), by the call-receiver terminal (an ISDN terminal), of the mode to which this terminal has been set. In other words, the description will start from the "call transfer processing" of step S5.

Upon receiving transfer-address information (the INFO message) from the ISDN interface 5, the communication controller 9 analyzes the transfer-address number at step S31 in FIG. 15. If the result of analysis is that the transfer destination field contains one number (e.g., "2010" shown in FIG. 14), then a YES decision is rendered at step S32, this extension terminal answers the incoming call and ordinary extension transfer processing is executed at step S37. In a case where the controller 9 detects time-out because this extension terminal has not answered, the controller 9 executes incoming-call processing (step S36) in accordance with the corresponding incoming-call mode (e.g., the call distributing mode, call centralizing mode or call-to-attendant console mode) of the group to which this terminal belongs.

On the other hand, if the result of the analysis of the transfer-addressed extension information field (FIG. 16) at step S31 is that the ISDN terminal has not been set to perform ordinary extension processing, then the program proceeds to step S39. If it is determined at step S39 that the ISDN terminal has been set to perform recording of the party's message and not transfer of an incoming call ($ID_1$=1 in FIG. 16), then the program proceeds to step S40. Based upon the recording channel field and playback channel field in FIG. 16, the communication controller 9 sends a call message to the voice recording unit 11 at step S40. Upon receiving a use-allowed message (a message 65 reading "USE ALLOWED" in the example of FIG. 14) from the voice recording unit 11, the controller 9 connects the call originator (user A in the example of FIG. 17) and the channel (channel "0" in the example of FIG. 14) of the voice recording unit 11 by the channel switch 8 and sends a standby message (a message 66 reading "PLEASE WAIT" in the example of FIG. 17) to the call originator (user A) at step S41.

Next, at step S42, the controller 9 monitors the state of use of the channel (channel "2" in the example of FIG. 14) for designating the voice recording unit 11. If the channel is not in use, then the controller 9 sends a recording request message (a message 67 reading "PLEASE RECORD YOUR MESSAGE AFTER THE TONE" in the example of FIG. 17) at step S43.

Further, the controller 9 connects the call originator (user A) and channel "2" of the voice recording unit 11 by the channel switch 8. At step S44, the message (68 in FIG. 17) of the call originator (user A) is recorded by the voice recording unit 11. This concludes the voice-message recording processing utilizing the call transfer.

If the result of the analysis performed at step S31 is that a plurality of transfer-addressed extension numbers, and not voice-message recording, have been designated in the INFO message (FIG. 16), the controller 9 transmits the set-up message to the ISDN extension interface 5 accommodating the designated transfer-addressed extension terminal. As a result, the ISDN extension interface 5 transmits the set-up message to the transfer-addressed extension terminal at step S33.

If the controller 9 detects a time-out (step S34) because the transfer-addressed extension terminal does not answer, it is verified at step S35 whether there is a designated extension terminal remaining. If another extension terminal designated as a transfer destination exists, a slide is effected to this extension terminal and the set-up message is transmitted thereto.

The processing of steps S33-S35 is repeated while a designated transfer-addressed extension terminal exists. If an extension terminal answers during this repeated execution of processing, the call transfer processing is concluded and the user A and transfer-addressed extension terminal are capable of communicating with each other.

In a case where the transfer-addressed extension terminal does not answer while this repetitive processing is being executed, the controller 9 executes incoming-call processing (step S36) in accordance with the incoming-call mode (e.g., the call distributing mode, call centralizing mode or call-to-attendant console mode) of the group to which this transfer-addressed extension belongs.

In the third embodiment set forth above, it is described that ISDN terminals are used for the call-originator terminal (user A), the call-transferrer terminal (user B) and the transfer-addressed terminal (user C). However, terminals other than the call-transferrer terminal (i.e., the call-receiver terminal) (user B) may be analog terminals other than ISDN terminals. In other words, it is necessary only that the call-transferrer terminal (user B) be an ISDN extension terminal. Further, the call-originator terminal (user A) may be one accommodated by an extension of the private branch exchange.

Fourth Embodiment

A fourth embodiment of the invention will now be described.

Figure 18:
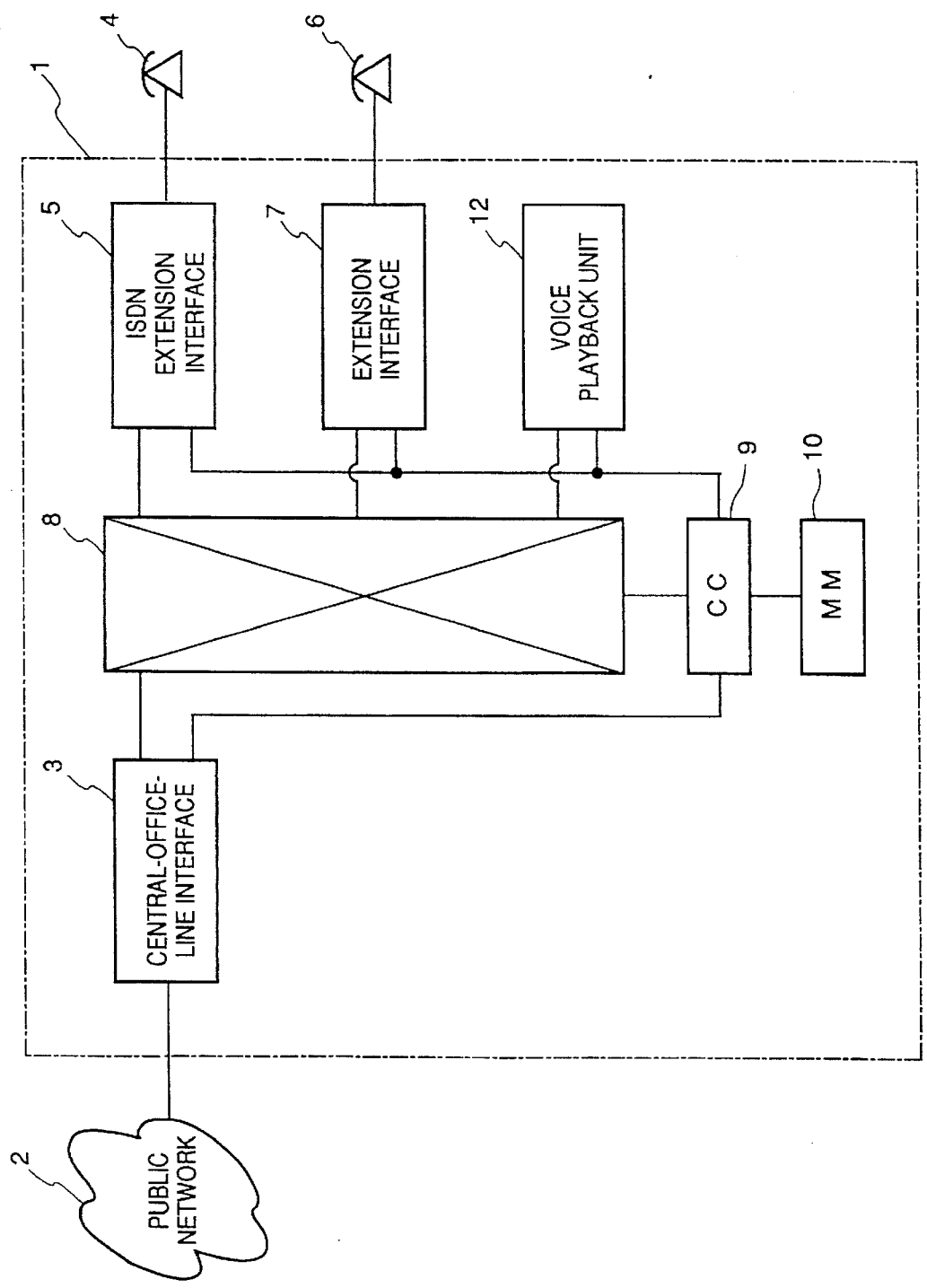
FIG. 18 is a block diagram showing the system configuration of a private branch exchange in a fourth embodiment of the present invention.

FIG. 18 is a block diagram showing the system configuration of a private branch exchange 1 in a fourth embodiment of the present invention. As shown in Fig. 18, the fourth embodiment is provided with a voice playback unit 12 instead of the voice recording unit 11 of the third embodiment.

Figure 19:
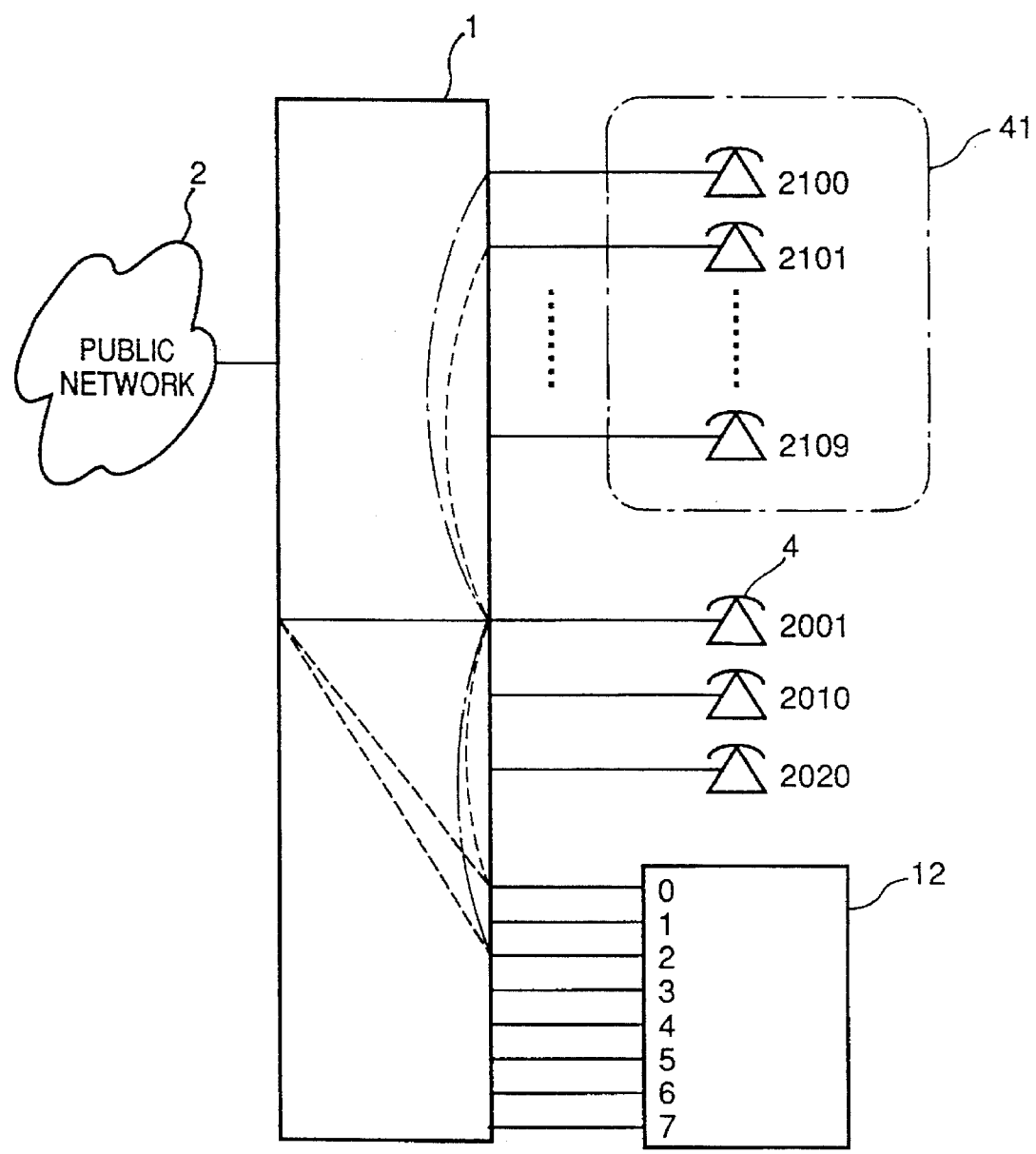
FIG. 19 is a block diagram, which shows an example of connections between a private branch exchange and extension terminals, for describing the fourth embodiment.

FIG. 19 is a block diagram, which shows an example of connections between a private branch exchange and extension terminals, for describing the fourth embodiment. Components identical with those shown in FIG. 5 are designated by like reference characters. Further, the voice playback unit 12 has eight channels of "0"-"7".

Figure 20:
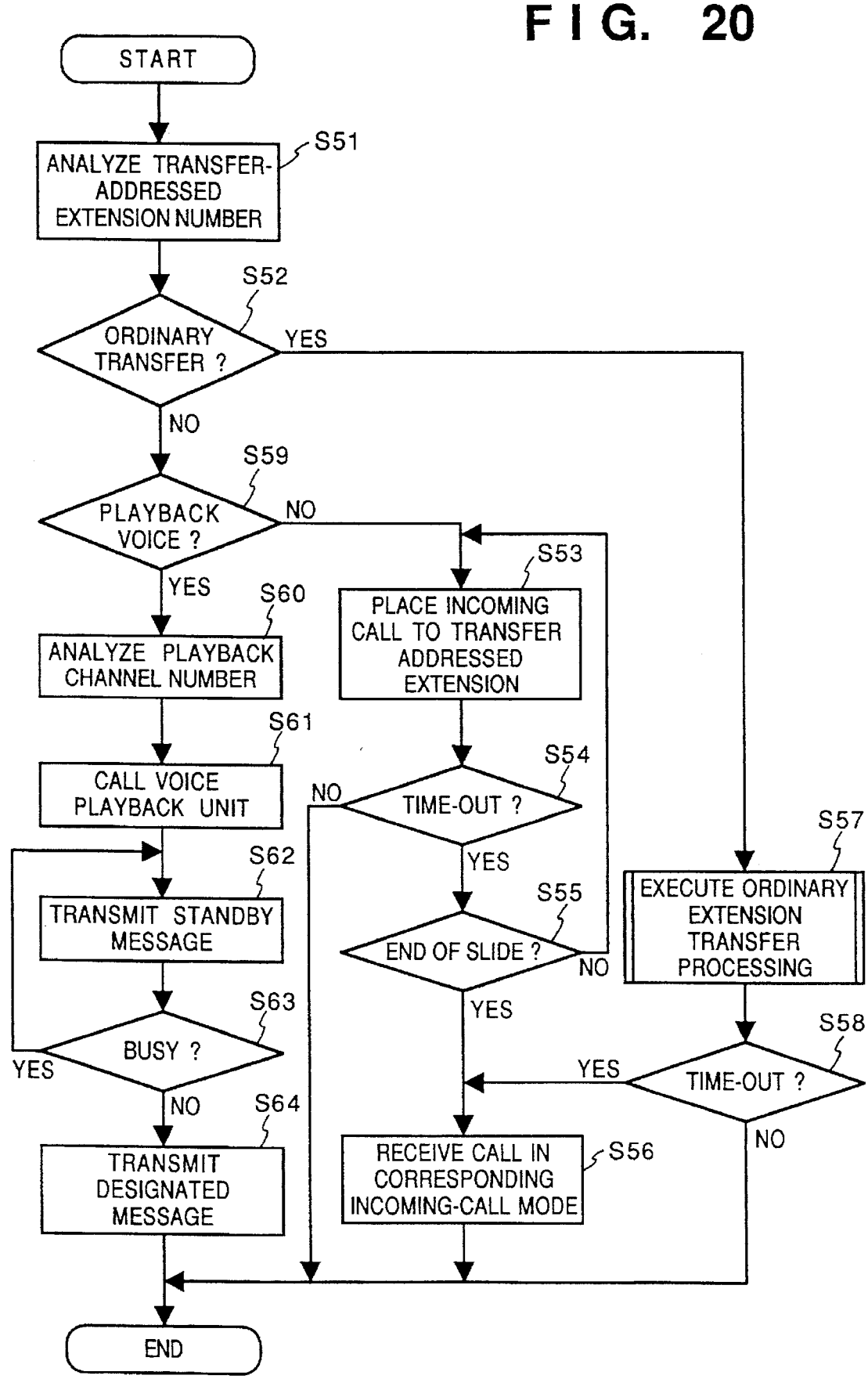
FIG. 20 is a flowchart showing call transfer processing in the private branch exchange of the fourth embodiment.
Figure 22:
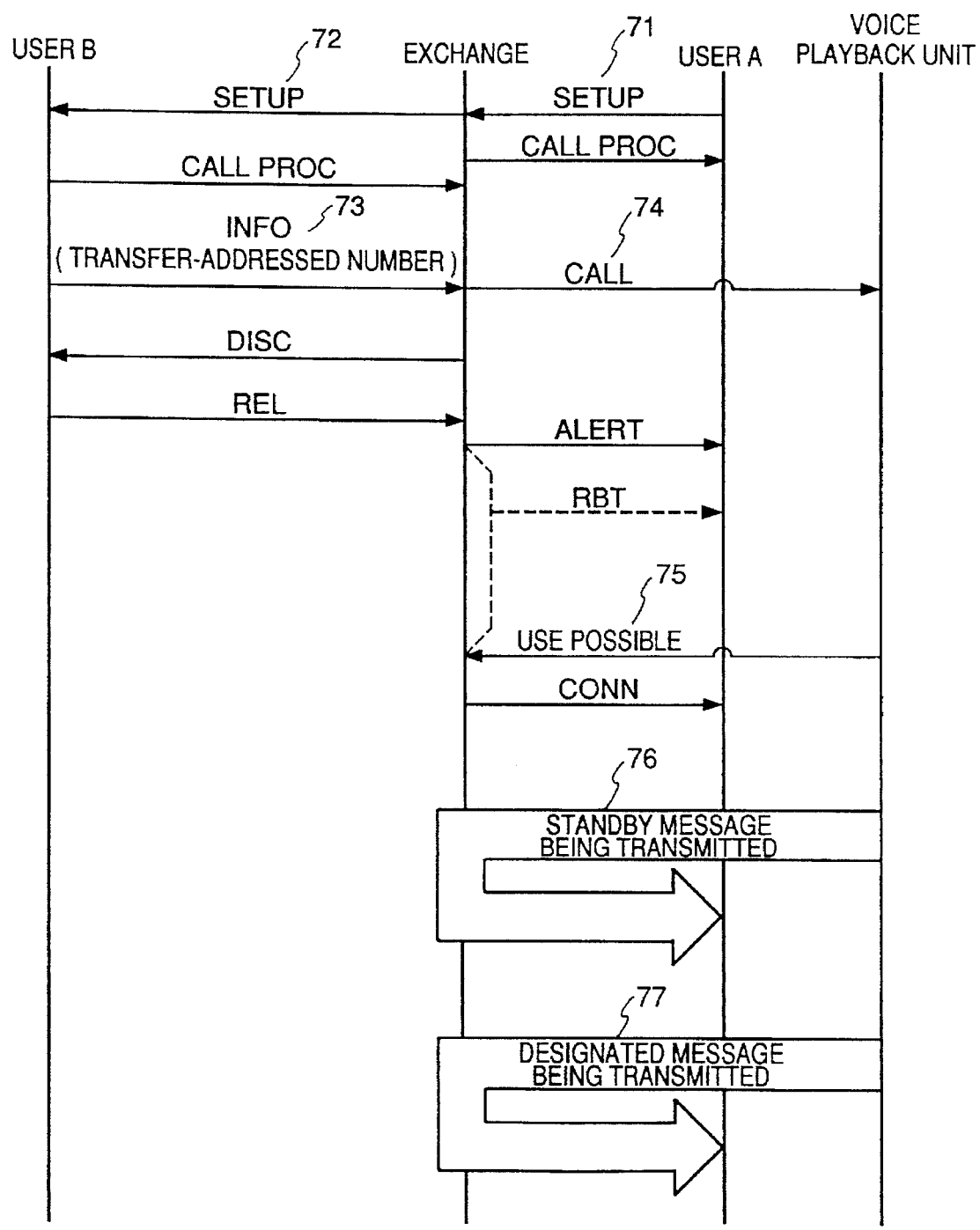
FIG. 22 is an explanatory view showing an example of a communication sequence in the private branch exchange of the fourth embodiment.

FIG. 20 is a flowchart showing call transfer processing in the fourth embodiment, and FIG. 22 is an explanatory view showing an example of a communication sequence in the fourth embodiment. The overall operation at the time of an incoming call in the fourth embodiment is the same as that of the first embodiment (FIG. 5). In FIG. 22, the terminals of users A and B are both assumed to be ISDN terminals.

The control procedure of call transfer processing according to the fourth embodiment will now be described in accordance with FIG. 20. For the sake of simplicity, however, the description will start from the point at which the exchange 1 is notified (step S5 in FIG. 6), by the call-receiver terminal (an ISDN terminal), of the mode to which this terminal has been set. In other words, the description will start from the "call transfer processing" of step S5. Furthermore, it is assumed in the fourth embodiment also that messages between the call-receiver terminal and the exchange have the format shown in FIG. 21.

Upon receiving an INFO message from the ISDN interface 5, the communication controller 9 analyzes the transfer-address number at step S51. If the result of analysis is that there is one transfer-address number (e.g., "2010" shown in FIG. 19), then this transfer-addressed extension terminal answers the incoming call and ordinary extension transfer processing is executed (step S57). In a case where the controller 9 detects a time-out at step S58 because this transfer-addressed extension terminal has not answered, the controller 9 executes incoming-call processing (step S56) in accordance with the corresponding incoming-call mode (e.g., the call distributing mode, call centralizing mode or call-to-attendant console mode) of the group to which this transfer-addressed extension belongs.

On the other hand, if the result of the analysis at step S51 is that the mode set at the call-receiver terminal is a mode for playing back a voice message (step S59), the controller 9 analyzes the channel (e.g., No. 2) of the playback message at step S60 and sends a call message (designated-message information, e.g., channel "2") to the voice playback unit 12. Upon receiving a use-allowed message 75 from the voice playback unit 12, the controller 9 connects the call originator (user A) and the channel "0" of the voice playback unit 12 by the channel switch 8 and sends a standby message (for example, a message 76 reading "PLEASE WAIT") to the call originator (user A) at step S62.

Next, at step S63, the controller 9 monitors the use of the designated message channel "2" of the voice playback unit 12. If the channel is not in use, then the controller 9 sends a designated message (for example, a message 67 reading "NOW IN CONFERENCE. WILL RETURN THIS AFTERNOON" to the call originator (user AS) at step S43. This concludes the voice-message playback processing utilizing the call transfer.

If the mode that has been set at the call-addressed terminal is a mode for performing the slide call and not the mode for playing back a voice message, then a plurality of transfer-addressed extension numbers will have been designated. Therefore, the controller 9 transmits the set-up message to the ISDN extension interface 5 accommodating the designated transfer-addressed extension terminal. As a result, the ISDN extension interface 5 transmits the set-up message to the transfer-addressed extension terminal at step S53.

If time runs out (step S54) because the transfer-addressed extension terminal does not answer, the controller 9 verifies at step S55 whether there is a designated transfer-addressed extension terminal remaining. If a transfer-addressed extension terminal exists, the controller 9 effects a slide to this extension terminal and transmits the set-up message thereto.

The processing of steps S53–S55 is repeated while a designated transfer-addressed extension terminal exists. If a transfer-addressed extension terminal answers during this repeated execution of processing, the call transfer processing is concluded and the user A and transfer-addressed extension terminal are capable of communicating with each other.

In a case where the transfer-addressed extension terminal does not answer while this repetitive processing is being executed, the controller 9 executes incoming-call processing (step S56) in accordance with the incoming-call mode (e.g., the call distributing mode, call centralizing mode or call-to-attendant console mode) of the group to which this transfer-addressed extension belongs.

In the fourth embodiment set forth above, it is described that ISDN terminals are used for the call-originator terminal (user A), the call-transferrer terminal (user B) and the transfer-addressed terminal (user C). However, terminals other than the call-transferrer terminal (i.e., the call-receiver terminal) (user B) may be analog terminals other than ISDN terminals. In other words, it is necessary only that the call-transferrer terminal (user B) be an ISDN extension terminal. Further, the call-originator terminal (user A) may be one accommodated by an extension of the private branch exchange.

Further, a plurality of channel numbers that output designated messages in the fourth embodiment may be registered and a plurality of voice messages may be combined and sent to the call originator.

Advantages of First through Fourth Embodiments

The private branch exchange of the first through fourth embodiments has the following advantages:

(1) Since a transfer-addressed extension number and an outside-line number are sent from the exchange in the form of messages, the internal memory of the exchange is not used for the registration of these numbers. As a result, the internal memory can be used effectively and additional memory need not be provided. This makes it possible to reduce cost.

(2) In a case where the destination of a transfer cannot be established at one location, a plurality of transfer destinations are designated. This makes it possible to transfer an incoming call to a plurality of locations to realize a transfer service of greater sophistication.

(3) Even if the extension (S point) of an exchange accommodates an ISDN terminal, the functions of terminals of an S/T point and T point can be effectively exploited to the maximum extent.

(4) By utilizing the call-transfer function of an ISDN terminal, the voice recording unit and voice playback unit of the exchange can be shared by the system, and each extension terminal need not be provided with a message recording function and a message playback function.

(5) By utilizing the call transfer function, the voice recording unit or voice playback unit can be instructed to record or play back a message. Consequently, it is unnecessary to perform a complicated setting operation from each ISDN terminal relative to the exchange. This enhances operability.

(6) Furthermore, data relating to voice recording or playback need not be registered using the internal memory of the exchange. This makes it unnecessary to increase the internal memory for this purpose and thus enables a reduction in cost.

Figure 23:
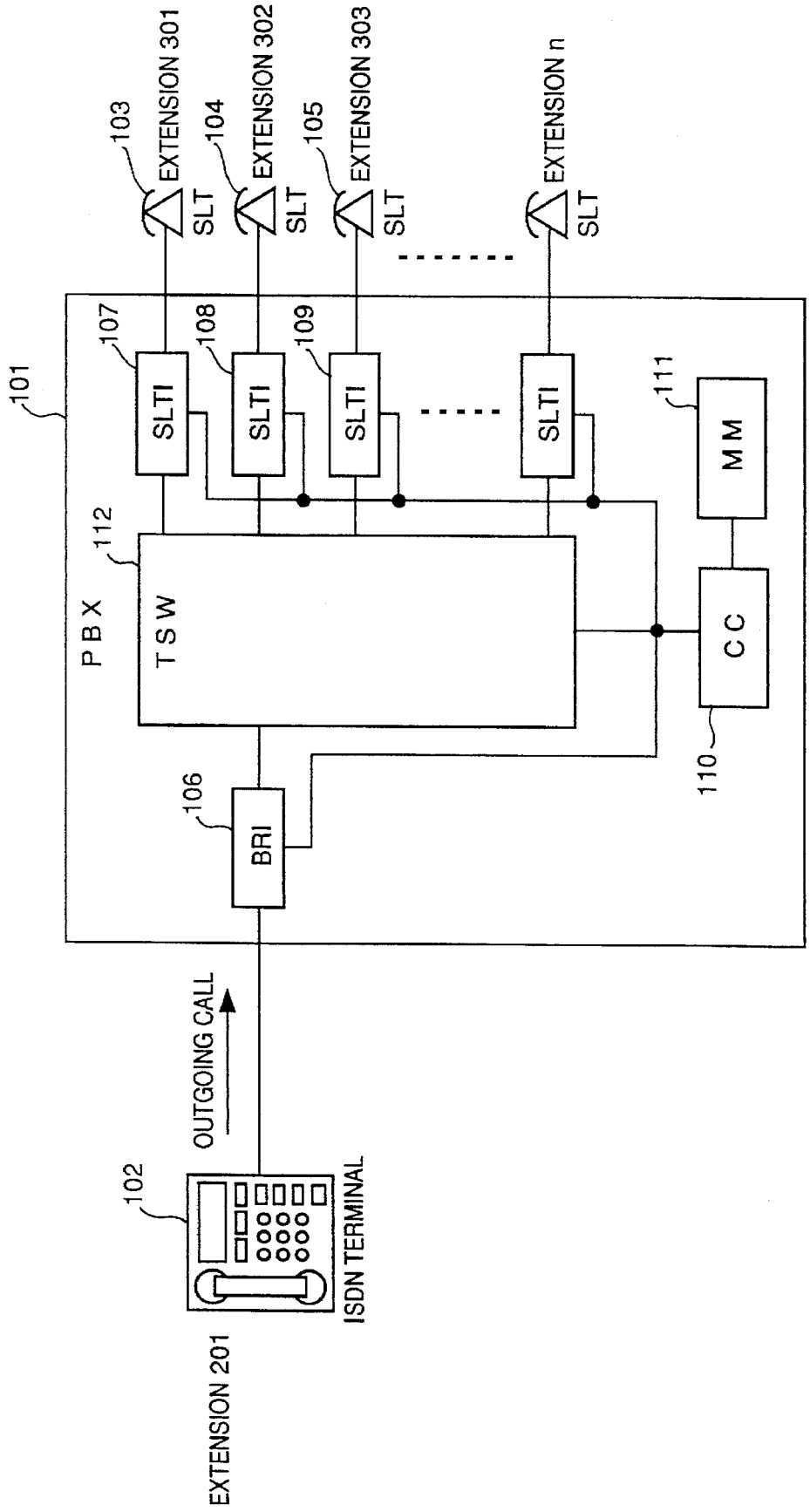
FIG. 23 is a block diagram showing the system configuration of a private branch exchange in fifth to eighth embodiments of the present invention.

Fifth through eighth embodiments described next relate to a shift call between extension terminals. FIG. 23 is a block diagram illustrating the system configuration of a PBX used jointly by the fifth through eighth embodiments.

As shown in FIG. 23, a PBX 501 accommodates, as extension terminals, an ISDN terminal 102 having extension number "201", and single line telephones (SLT) 103–105 having extension numbers "301"–"303", respectively.

The PBX 101 has an ISDN extension interface (BRI) 106 for interfacing the ISDN terminal 102, SLT extension interfaces (SLTI) 107–109 for interfacing the SLT's 103–105, respectively, a communication controller (CC) 110 for supervising overall control of the PBX 101, a main memory (MM) 111 for storing various programs and data, and a channel switch (TSW) 112 for connecting a voice channel when an extension conversation is performed.

The BRI 106 has call detecting means for detecting origination of a call from the ISDN terminal 102. The ISDN 102 is capable of originating a call that designates the extension numbers of a plurality of parties. The controller 110 has a call number retrieving unit for retrieving information which designates the receiving party from the set-up message, when a call originates from the ISDN terminal 102, a call number analyzing unit for analyzing a plurality of called extensions from the information retrieved, and an incoming-call control unit for controlling the incoming call to the called extension. The memory 111 has a call-status storage table for storing the status of extensions.

Fifth Embodiment

The characterizing feature of the shift call in the fifth embodiment is that the terminal numbers of a plurality of shift-call destinations are designated so as to be arrayed in the order of the shift.

More specifically, in a case where the extension numbers of a plurality of parties are designated from the ISDN terminal 102 in the fifth embodiment, the individual party numbers are marked off by "*" and set in the called number information field. See FIG. 26. By way of example, in a case where extension numbers "301", "598", "826" are designated, "301*598*826" is set in the called number information field.

Figure 24:
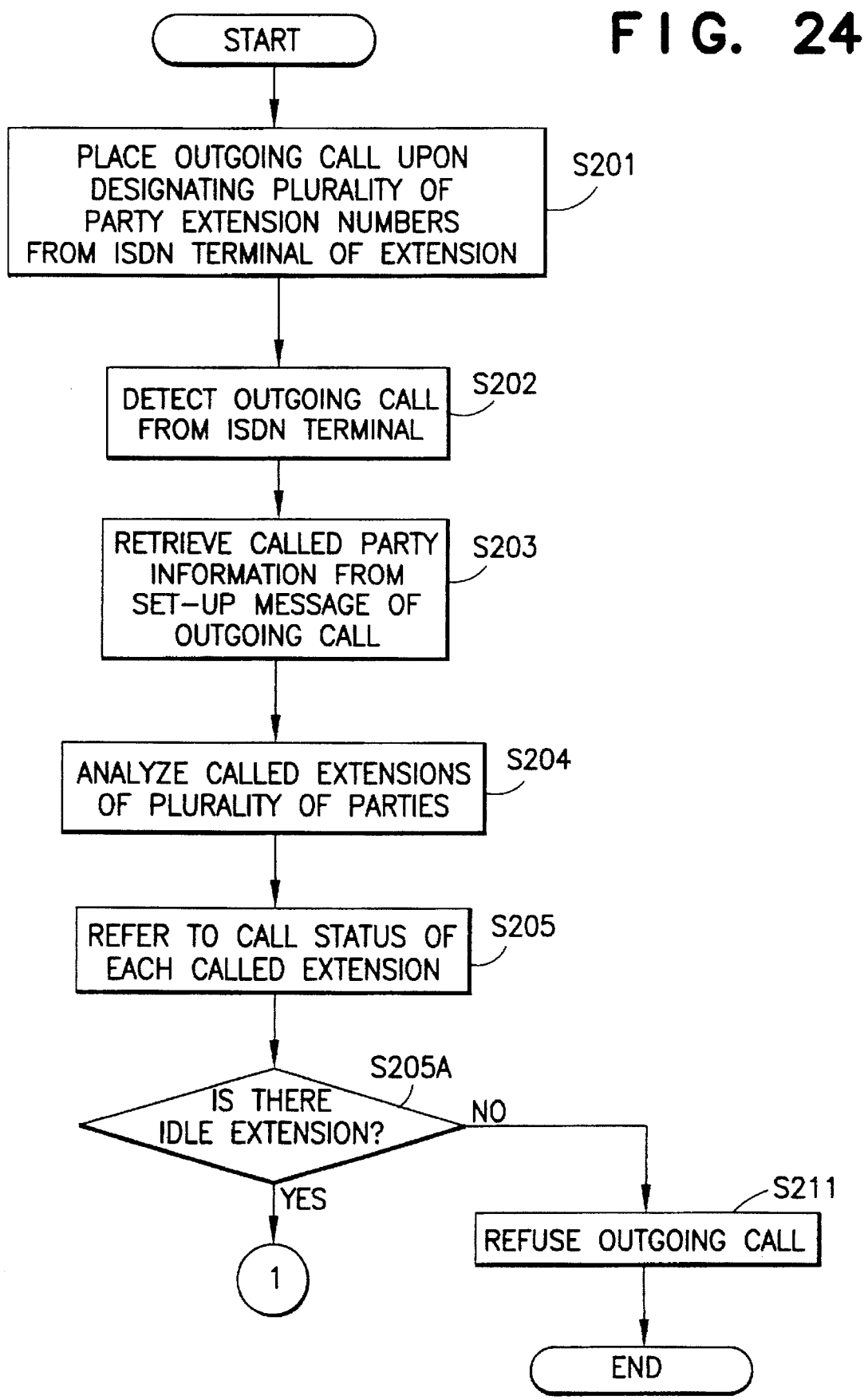
FIG. 24 is a flowchart illustrating the operation of the fifth embodiment.
Figure 25:
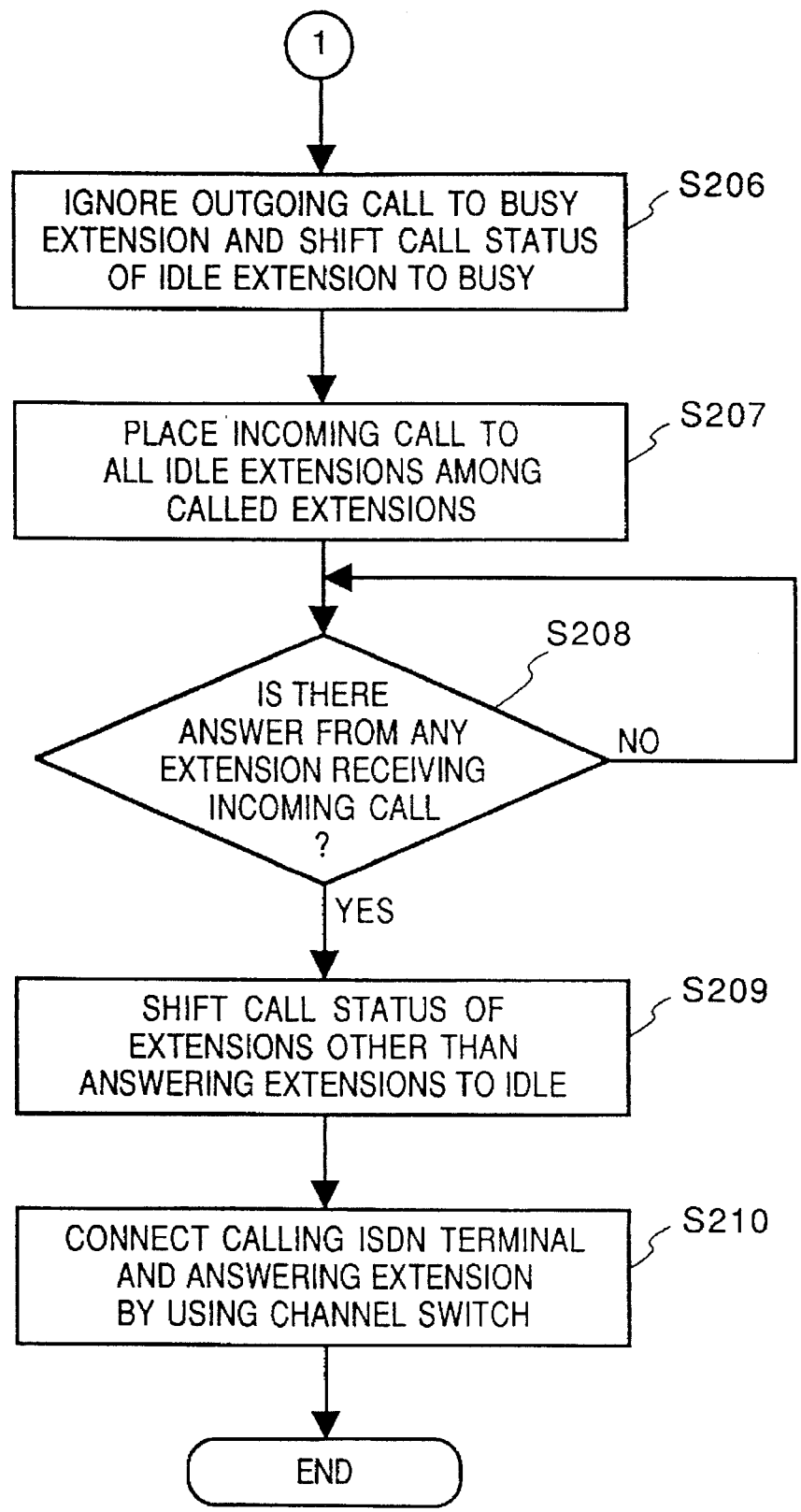
FIG. 25 is a flowchart illustrating the operation of the fifth embodiment.

FIGS. 24 and 25 are flowcharts illustrating a procedure for transmitting an outgoing call from the ISDN terminal 102 to another extension.

The control procedure will be described assuming a case in which the ISDN terminal 102 (extension "201") establishes communication with extension "301", "302" or "303". First, "301*302*303" is set in the called number information field of the set-up message and then the ISDN terminal 102 then transmits this outgoing call (step S201). When this is done, the call detecting unit of BRI 106 in the PBX 101 detects this outgoing call and so notifies the controller 110 (step S202). Upon receiving notification of the outgoing call, the controller 110 retrieves the information, which designates the number of the called party, from the set-up message of this call and extracts the information (step S203).

FIG. 26 is an explanatory view showing the format of a set-up message. Ordinarily, the information that designates the called party's number is contained in a call number 606 or in a keypad facility information element 605.

Upon extracting the party-number information based upon the format shown in FIG. 26, the controller 110 analyzes the called extensions from this information (step S204) and judges that the called extensions are the extensions number "301", "302" and "303". Next, the controller 110 examines the call status of these extension numbers by referring to the call-status storage table within the memory 111 (step S205).

FIG. 27 is an explanatory view showing the constitution of the call-status table. This table comprises an extension-terminal number field and a field that stores the status of each call. As shown in Fig. 27, extension "301" is in use and therefore a call cannot be received. Extensions "302", "303", on the other hand, are idle and are capable of receiving a call.

Accordingly, the controller 101 neglects the call to extension "301" and shifts the call status of extensions "302" and "303" in the call status storage table of memory 111 from the idle state to the busy state (step S206) and controls the SLTI's 108, 109 corresponding to the extension numbers "302", "303" so that the SLT's 104, 105 of the extensions "302", "303" will receive the incoming call (step S207).

It assumed here that the STL (Single Line Telephone) of extension "303" answers before the STL of extension "302".

When the STLI (Single Line Telephone Interface) 109 detects that the extension "303" has answered (step S208), it so notifies the controller 110. Upon being notified of the answer, the controller 110 controls the SLTI 108 to stop the call from being received by the extension "302", returns the extension "302" of the call-status storage table in the memory 111 from the "busy" to "idle" (step S209) and controls the channel switch 112 to connect the extension "201" with the voice channel of the extension "303". When the voice channel is connected, communication between extension "201" and extension "303" starts (S210).

Next, a case will be described in which a call is transmitted from the ISDN 102 upon setting "301*302*303" in the called number information field. If the extensions "301", "302", "303" are all busy in this case, then processing proceeds in the order of steps S201 → S202 → S203 → S204 → S205 → S205A. At step S205A, the controller 110 detects that all of the extensions "301", "302", "303" are busy and controls the BRI 106 to refuse the call from the ISDN terminal 102 of the extension "201" (step S211). As a result, the ISDN terminal 102 ascertains that the plurality of parties to which the outgoing call was placed are all busy.

Sixth Embodiment

A sixth embodiment of the invention will now be described with reference to FIGS. 23 through 27.

In FIG. 23, the PBX 101 has a function for designating a plurality of extension numbers, only the last digits of which differ, from the ISDN terminal 102 and sending an outgoing call to the terminals of these extension numbers. The extension numbers are designated in such a manner that the first extension number is followed by the last digits of the other extension numbers in the order of designation. This string of numerals is then set in the "called number information field".

For example, in a case where the extension numbers "301", "303", "302" are designated, "30132" is set in the called number information field.

This will be described in accordance with FIG. 24. It will be assumed that the ISDN terminal 102 (extension "201") has made a transmission requesting communication with extension "301", "303" or "302". When this is done, "30132" is set in the called number information field of the set-up message of the ISDN terminal 102 and the call is transmitted (step S201). The origination of this call is detected by the call detecting unit of BRI 106 in the PBX 101, and the controller 110 is so notified (step S202).

Upon receiving notification of the outgoing call, the controller 110 retrieves the information, which designates the number of the called party, from the set-up message of this call and extracts the information (step S203). The controller 110 then analyzes the called extensions from the party-number information and determines that the called extensions are the extensions "301", "303" or "302" (step S204). The processing that follows this step is identical to the processing of steps S205–211 in the fifth embodiment and need not be described again.

In the sixth embodiment, the operation for setting a plurality of extension numbers is simplified so that a system more user friendly than that of the fifth embodiment can be obtained.

Seventh Embodiment

An seventh embodiment of the invention will now be described. The system configuration of this embodiment is the same as that shown in FIG. 23 and identical components are identified by like reference characters.

Figure 28:
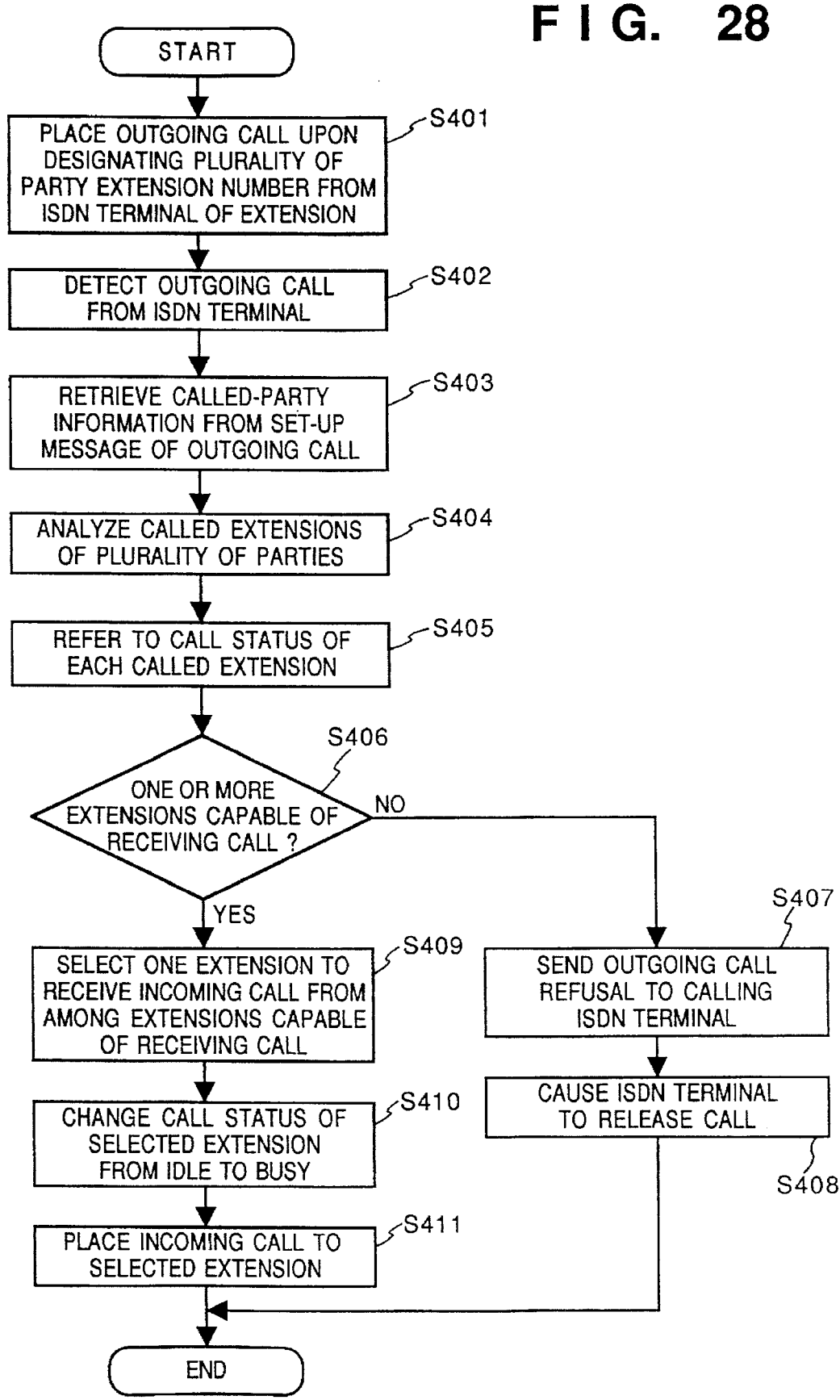
FIG. 28 is a flowchart illustrating the operation of a seventh embodiment of the invention.

FIG. 28 is a flowchart illustrating a procedure through which an outgoing call is placed from the ISDN terminal 102 to other extensions in the seventh embodiment. By a method similar to that of the sixth embodiment, the system of the eighth embodiment is such that the ISDN terminal 102 is capable of designating and sending an outgoing call to a plurality of extensions.

First, it is assumed that "301*302*303" has been set in the called number information field of the set-up message from the ISDN terminal 102 (extension "201") and that there has been a transition requesting communication with extension "301", "302" or "303" (step S401). The call detecting unit of BRI 106 in the PBX 101 detects this outgoing call and so notifies the controller 110 (step S402).

Upon receiving notification of the outgoing call, the controller 110 retrieves the information, which designates the number of the called party, from the set-up message of this call and extracts the information (step S403). The method of extracting the number of a party is the same as in the fifth embodiment described above.

When the party-number information has been extracted, the controller 110 analyzes the called extensions from the party-number information, determines that the called extensions are "301", "302", "303" (step S404) and examines the call status of these extension numbers by referring to the call-status storage table within the memory 111 (step 4305).

The controller 110 determines whether several of the designated extensions are capable of receiving the incoming call. If all of the extensions "301", "302", "303" are busy, then the controller 110 controls the BRI 106 to send BT to the ISDN terminal 102 of extension "201" and refuse the outgoing call (step S407). As a result, the ISDN terminal 102 ascertains that the plurality of parties to which the outgoing call was placed are all busy and releases the call (step S408).

If one or more of the designated extensions is capable of receiving the incoming call, one of these extensions is selected (step S409) and the call status thereof is shifted from the idle state to the busy state (step S410) and the SLTI corresponding to this extension is controlled so that this SLT receives the call (step S411). As for methods of selecting the one extension, it can be arranged to select the lowest extension number or the extension number set first in terms of the set order.

Thus, in the seventh embodiment, only one extension of a plurality of designated extensions is selected to receive an incoming call. In comparison with each of the foregoing embodiments, in which an incoming call is received by a plurality of extensions, the number of cases in which an answer is not obtained can be expected to increase slightly but the number of cases in which an incoming call cannot be received because of busy parties can at least be greatly reduced over the prior art and satisfactory effects can be obtained.

Further, as in the second embodiment, it is possible to designate, from the ISDN terminal 102, a plurality of parties whose extension numbers differ only in their last digit, and to send an outgoing call to these parties. For example, in a case where the extension numbers "301", "303", "302" are designated, "30132" is set in the called number information field.

Eighth Embodiment

An eighth embodiment of the invention will now be described. The system configuration of this embodiment is the same as that shown in FIG. 23 and identical components are identified by like reference characters.

Figure 29:
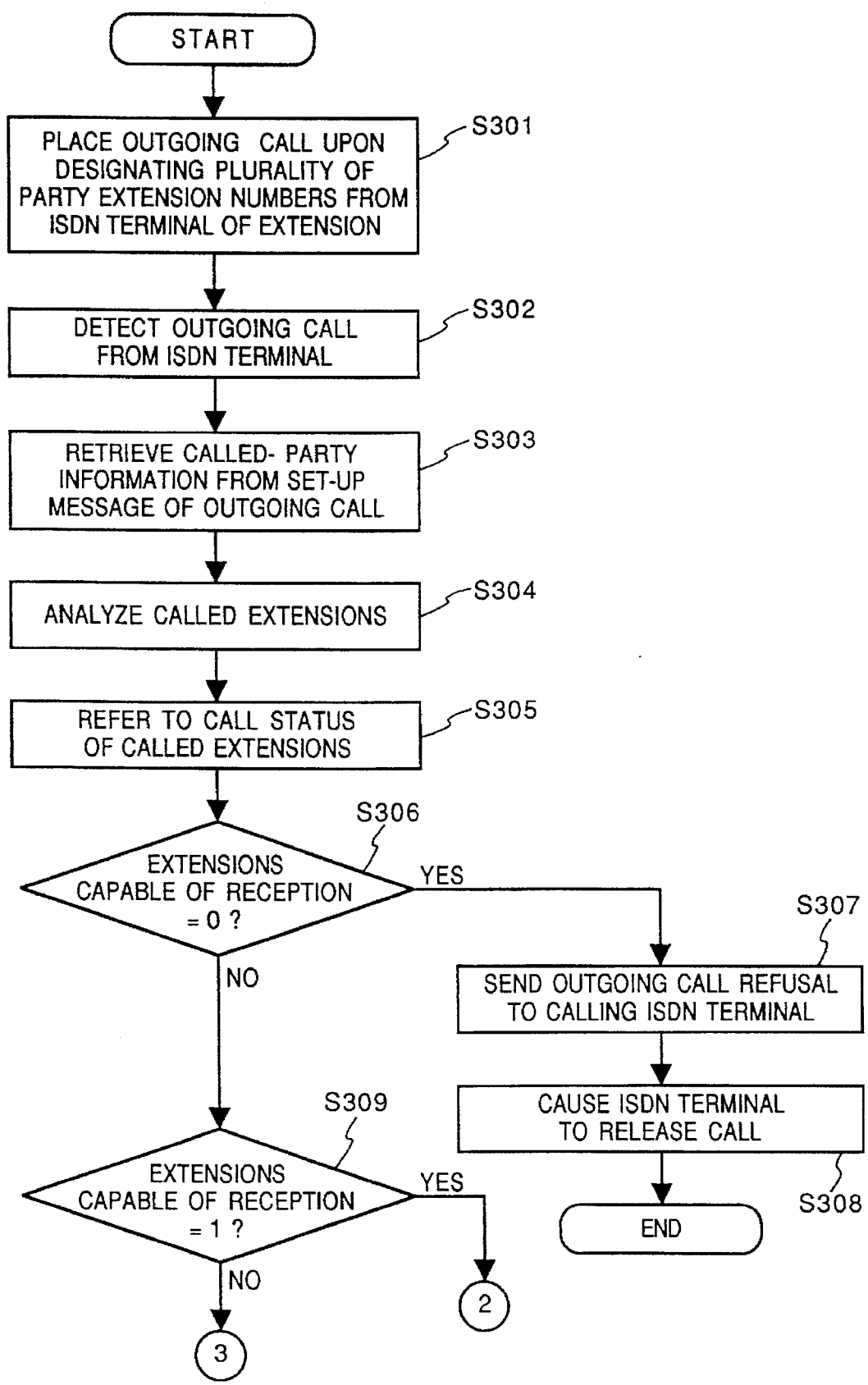
FIG. 29 is a flowchart illustrating the operation of a eighth embodiment of the invention.
Figure 30:
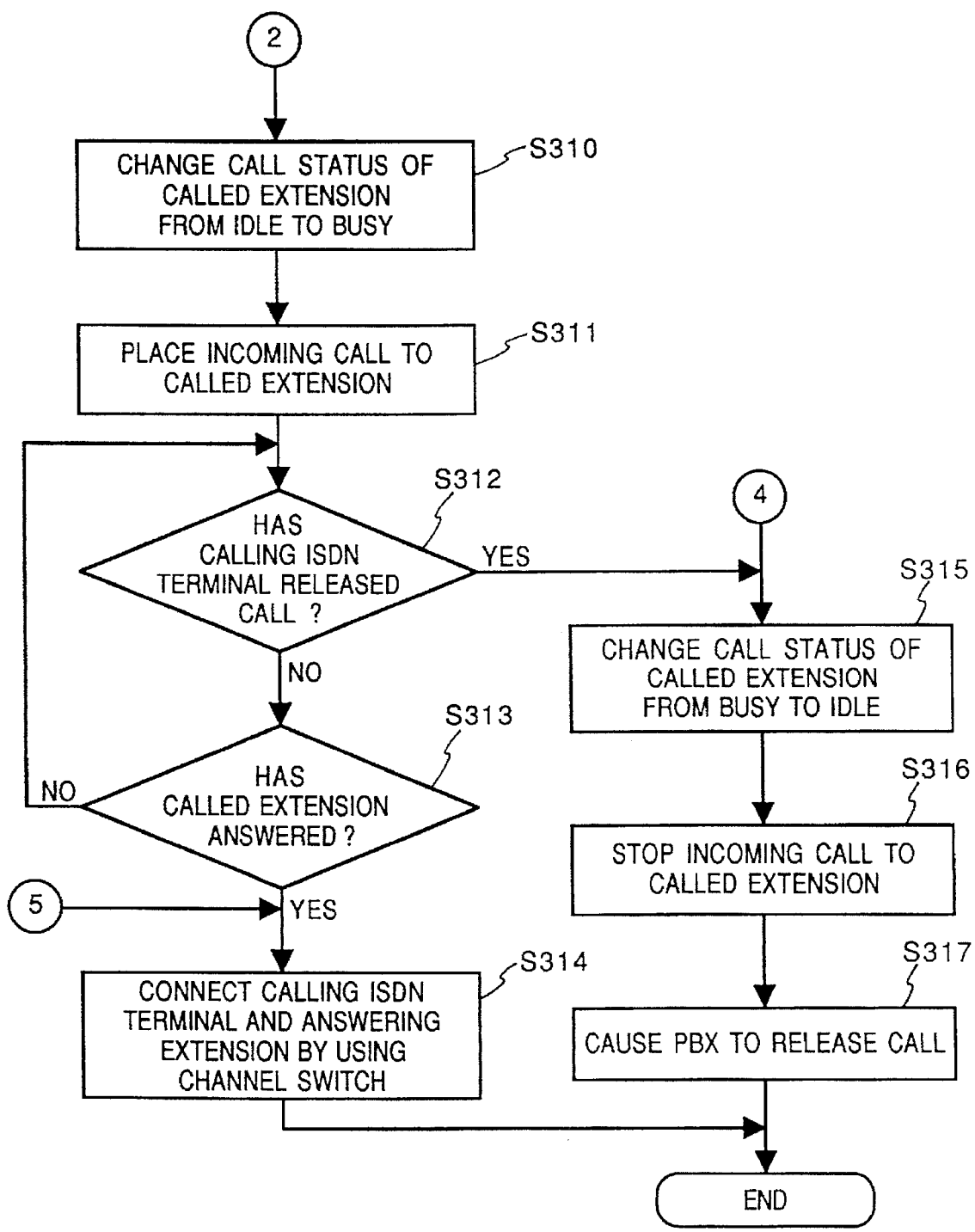
FIG. 30 is a flowchart illustrating the operation of the eighth embodiment.
Figure 31:
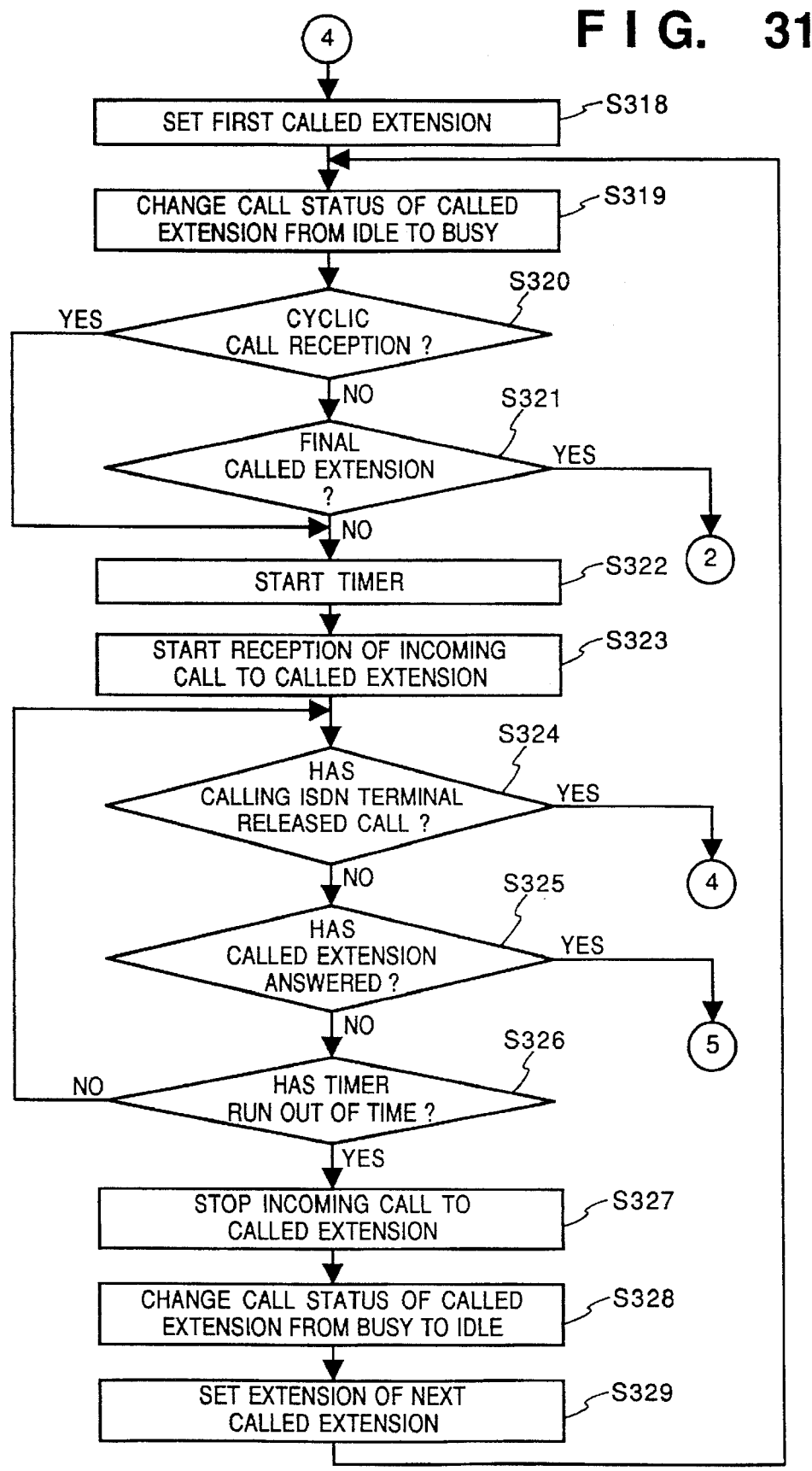
FIG. 31 is a flowchart illustrating the operation of the eighth embodiment.

FIGS. 29 through 31 are flowcharts illustrating a procedure through which an outgoing call is placed from the ISDN terminal to other extensions in the eighth embodiment. By a method similar to that of the fifth embodiment, the system of the eighth embodiment is such that the ISDN terminal 102 (extension "201") is capable of designating and sending an outgoing call to a plurality of extensions such as extensions "301", "302", "303", etc.

A case will be assumed in which the ISDN terminal 102 establishes communication with extension "301", "302" or "303". Accordingly, "301*302*303" is set in the called number information field of the set-up message from the ISDN terminal 102 and this outgoing call is then transmitted (step S301). The call detecting unit of BRI 106 in the PBX 101 detects this outgoing call and so notifies the controller 110 (step S302).

Upon receiving notification of the outgoing call, the controller 110 retrieves the information, which designates the number of the called party, from the set-up message of this call and extracts the information (step S303). The method of extracting the number of a party is the same as in the sixth embodiment described above.

When the party-number information has been extracted, the controller 110 analyzes the called extensions from the party-number information, determines that the called extensions are "301", "302", "303" (step S304) and examines the call status of these extension numbers by referring to the call-status storage table within the memory 111 (step S305).

The controller 110 determines whether several of the designated extensions are capable of receiving the incoming call. If all of the extensions "301", "302", "303" are busy, then the number of extensions capable of receiving the incoming call is zero (YES at step S306). Accordingly, the controller 110 controls the BRI 106 to send BT to the ISDN terminal 102 and refuse the outgoing call (step S307). As a result, the ISDN terminal 102 ascertains that the plurality of parties to which the outgoing call was placed are all busy and releases the call (step S308).

In a case where one extension is capable of receiving a call (step S309), the call status of the corresponding extension in the call-status storage table is shifted from the idle status to the busy status (step S310) and the SLTI corresponding to this extension is controlled so that the call is received by this SLT (step S311).

The PBX 101 causes the ISDN terminal 102 to issue the RBT while the SLT is receiving the call and the party is being called.

In a case where the SLT answers (step S313), this SLTI is detected and the controller 110 is so notified. Upon being notified of the answer, the controller 110 controls the channel switch 112 to connect the voice channel of the ISDN extension and the answering extension and effects a transition to the conversational state (step S314).

If the SLT does not answer within a certain period of time (step S313), the ISDN 102 determines that the party cannot answer and releases the call (step S312). In this case, the controller 110 shifts the area corresponding to this extension in the call-status storage table of the memory 111 from the busy state to the idle state (step S315), stops the call from being received by the called extension (step S316) and releases the call (step S317).

In a case where a plurality of extensions can receive the incoming call, a NO decision is rendered at step S309 and the program proceeds to step S318. Here the controller 110 monitors elapsed time by an incoming-call measurement timer (not shown) and, while this monitoring is being performed, changes over the called extensions at fixed time intervals (e.g., every minute) so that these terminals are called successively at this time interval. In other words, the first extension among the called extensions is set (step S318), and the call status of this extension in the call-status storage table is shifted from "idle" to "busy" (step S319). The aforementioned timer is then started (step S322) and this extension begins receiving the call so that the corresponding SLT is called from the corresponding SLTI (step S323).

In a case where the ISDN terminal 102 has released the call (step S324), the processing from step S315 onward is executed. When a called extension answers (step S325), the processing from step S314 onward is executed.

In a case where a call is not released by the ISDN terminal 102 or no answer is obtained from a called extension, the called extension continues to receive the call (step S326) until the aforementioned timer runs out of time. When the timer runs out of time, the incoming call to this called extension is stopped (step S327) and the call status of this called extension is shifted from the busy status to the idle status (step S328), after which the next extension is set (step S329) and the program returns to step S319 to repeat similar processing.

In the eighth embodiment, if there is no answer even if one of a plurality of designated extensions receives an incoming call when the call is issued by the ISDN terminal 102, an ordinary mode is selected, in which the incoming call is abandoned as is, or a cyclic mode is selected, in which call reception is changed over repeatedly a number of times until any designated extension answers. For example, when the cyclic mode is designated, the aforementioned extensions "301", "302", "303" are set in the called number information field in the set-up message, followed by the symbol "*", so that "301*302*303" is set.

As a result, the controller 110 is capable of determining at step S320 whether the cyclic mode has been selected. If the cyclic mode has been selected, the operation from step S322 onward is performed. If the cyclic mode has not been selected, it is determined whether the extension selected at step S329 is the final call-receiver terminal (step S321). If it is not the final call-receiver terminal, then the processing from step S322 onward is executed. If this terminal is the final call-receiver terminal, then the program proceeds to the steps from step S310 onward and processing relating to the final extension is executed.

Even in this arrangement in which a plurality of extensions capable of receiving a call are changed over by the timer so as to receive an incoming call in order, it is possible to designate, from the ISDN terminal 102, a plurality of parties whose extension numbers differ only in their last digit, and to send an outgoing call to these parties, just as in the sixth embodiment described above. For example, in a case where the extension numbers "301", "303", "302" are designated, "30132" is set in the called number information field. In this case also, selection of the aforesaid cyclic mode is possible by setting "30132*".

In each of the fifth through eighth embodiments described above, the party extension terminal to which an outgoing call is sent from the ISDN terminal is not limited to an SLT. Further, in the fifth through eighth embodiments, the call number retrieving means for retrieving information, which designates the receiving party from the set-up message, and the call number analyzing means for analyzing the plurality of called extensions from the information retrieved need not necessarily be provided in the controller (110); these means can be provided in the ISDN extension interface.

Furthermore, in the fifth through eighth embodiments, so long as the method of designating a plurality of party numbers from an ISDN terminal of an extension is such that the plurality of party numbers can be designated in the set-up message, any method may be employed.

Advantages of Fifth through Eighth Embodiments

The private branch exchange of the fifth through eighth embodiments has the following advantages:

(1) When an outgoing call is sent from an ISDN terminal to another extension, a plurality of party numbers are designated, all extensions, among the designated plurality of parties, that are capable of receiving the incoming call receive the call and a conversation is established with the extension terminal that answers first, with the incoming calls to the other extensions being released. By virtue of this arrangement, there is a greater probability that an extension can receive an incoming call from the ISDN terminal, and a greater probability that an answer will be obtained from a called extension. Accordingly, whenever a called party is busy or there is no answer, the troublesome task of releasing the call each time and re-sending the call to the next terminal can be eliminated.

(2) If an outgoing call is sent from an ISDN terminal to another extension, a plurality of party numbers are designated and a plurality of extensions capable of receiving the call exist among the plurality of parties, then one of these extensions is selected and made to receive the incoming call. Accordingly, there is a greater probability that an extension can receive an incoming call from the ISDN terminal. Accordingly, whenever a called party is busy, the troublesome task of releasing the call each time and re-sending the call to the next terminal can be eliminated.

(3) If an outgoing call is sent from an ISDN terminal to another extension, a plurality of party numbers are designated and a plurality of extensions capable of receiving the call exist among the plurality of parties, then these extensions can be made to receive the call in regular order by changing over among them using a timer. Accordingly, there is a greater probability that an extension can receive an incoming call from the ISDN terminal, and a greater probability that an answer will be obtained from a called extension. Accordingly, whenever a called party is busy or there is no answer, the troublesome task of releasing the call each time and re-sending the call to the next terminal can be eliminated.

As many apparently widely different embodiments of the present invention can be made without departing from the spirit and scope thereof, it is to be understood that the invention is not limited to the specific embodiments thereof except as defined in the appended claims.

What is claimed is:

1. A private branch exchange comprising:

detecting means for detecting that a call is originated by a digital extension terminal, the call including information to designate a plurality of extensions;

managing means for managing status of the plurality of extensions designated in the information included in the call;

determining means for referring to said managing means when said call is detected by said detecting means, thereby determining whether one or more of the plurality of extensions is capable of receiving said call; and control means for performing, when said determining means determines that one or more extensions capable of receiving said call exists in the plurality of extensions, a control to establish a communication link between said digital extension terminal and one extension of said one or more extensions capable of receiving said call.

2. A private branch exchange comprising:

detecting means for detecting that a call is originated by a digital extension terminal, the call including information to designate a plurality of extensions;

managing means for managing status of the plurality of extensions designated in the information included in the call;

determining means for referring to said managing means when said call is detected by said detecting means, thereby determining whether one or more of the plurality of extensions is capable of receiving said call; and control means for selecting, when said determining means determines that at least two available extensions which are capable of receiving said call exist, one of said at least two available extensions, and for performing a control to establish a communication link between said digital extension terminal and the selected extension.

3. A private branch exchange comprising:

detecting means for detecting that a call is originated by a digital extension terminal, the call including information to designate a plurality of extensions;

managing means for managing status of the plurality of extensions designated in the information included in the call;

determining means for referring to said managing means when said call is detected by said detecting means, thereby determining whether one or more of the plurality of extensions is capable of receiving said call; and control means for selecting, when said determining means determines that at least two available extensions which are capable of receiving the call exist, a first of the available extensions, calling said first selected extension, determining whether or not the first selected extension responds to the calling, selecting a second extension from among the available extensions to be called at predetermined time intervals if the first selected extension does not respond to the calling, and performing a control to establish a communication link between said digital extension terminal and said first or second selected extension whichever selected extension responds to the calling.

4. A private branch exchange comprising:

first interface means for interfacing a plurality of extension terminals;

second interface means for interfacing a digital terminal and communicating signals with said digital terminal in accordance with a predetermined procedure, said digital terminal being connected as an extension terminal;

transmitting means for transmitting a first message to said digital terminal via said second interface means, the first message being for initially informing said digital terminal of an incoming call addressed to said digital terminal and establishing a communication link with said digital terminal, the transmission being in response to the incoming call addressed to said digital terminal;

receiving means for receiving a second message in which transfer address information indicating a plurality of extension terminals can be set from said digital terminal after transmitting the first message, the second message being a response signal corresponding to the first message;

analyzing means for analyzing the second message and thereby determining whether or not transfer address information indicating the plurality of extension terminals is set in the second message; and transferring means for transferring the incoming call to one of said plurality of extension terminals designated in the transfer address information of the second message in accordance with a determination by said analyzing means.

5. The exchange according to claim 4, wherein the transfer address information includes a set of extension information, the set of information indicating the plurality of extension terminals to which the incoming call is transferred.

6. The exchange according to claim 4, wherein the transfer address information includes plural sets of extension information, the plural sets of extension information indicating extension terminals of the plurality of extension terminals to which the incoming call is transferred.

7. The exchange according to claim 5, wherein said transferring means checks whether each of the plurality of extension terminals designated in the transfer address information is available for the call transfer, and transfers the incoming call to an available extension terminal of the plurality of extension terminals designated in the transfer address information.

8. The exchange according to claim 4, wherein said digital terminal is a terminal for an integrated services digital network.

9. A private branch exchange comprising:

first interface means for interfacing a plurality of extension terminals;

second interface means for interfacing a digital terminal and communicating signals with said digital terminal in accordance with a predetermined procedure, said digital terminal being connected as an extension terminal;

transmitting means for transmitting a first message to said digital terminal via said second interface means, the first message being for initially informing said digital terminal of an incoming call addressed to said digital terminal and establishing a communication link with said digital terminal, the transmission being in response to the incoming call addressed to said digital terminal;

receiving means for receiving a second message including information relating to a call transfer from said digital terminal after transmitting the first message, the second message being a response signal corresponding to the first message;

recording means for recording a voice message from a caller of the incoming call; and control means for discriminating whether the information of the second message indicates a call transfer to said recording means or a call transfer to an extension terminal, and performing in accordance with the discrimination a control to connect a communication path corresponding to the incoming call to said recording means so as to record the voice message or a control to transfer the incoming call to an extension terminal designated in the information of the second message.

10. The exchange according to claim 9, wherein the information of the second message includes transfer address information designating a plurality of extension terminals, and said control means transfers the incoming call to one of the plurality of extension terminals designated in the transfer address information.

11. A private branch exchange comprising;

first interface means for connecting a plurality of extension terminals;

second interface means for connecting a digital terminal as an extension terminal, and communicating digital signals with said digital terminal in accordance with a predetermined procedure, said digital terminal being connected as an extension terminal;

transmitting means for transmitting a first message to the digital terminal via said second interface means, the first message being for initially informing said digital terminal of an incoming call addressed to said digital terminal and establishing a communication link with said digital terminal, the transmission being in response to the incoming call addressed to said digital terminal;

receiving means for receiving a second message including information relating to a call transfer from said digital terminal after transmitting the first message, the second message being a response signal corresponding to the first message;

reproducing means for reproducing a voice message; and control means for discriminating whether the information of the second message indicates a call transfer to said reproducing means or a call transfer to an extension terminal, and performing in accordance with the discrimination a control to connect a communication path to said reproducing means corresponding to the incoming call, so as to send the voice message to a caller of the incoming call or a control to transfer the incoming call to an extension terminal designated in the information of the second message.

12. The exchange according to claim 11, wherein the information includes transfer address information designating a plurality of extension terminals, and said control means transfers the incoming call to one of the plurality of extension terminals designated in the transfer address information.

* * * * *